United States Patent
Watanabe et al.

(10) Patent No.: US 6,321,987 B1
(45) Date of Patent: *Nov. 27, 2001

(54) BAR CODE READING APPARATUS FOR READING PLURAL CODE SYSTEMS

(75) Inventors: Mitsuo Watanabe; Shinichi Sato; Isao Iwaguchi; Ichiro Shinoda, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/534,155

(22) Filed: Mar. 24, 2000

Related U.S. Application Data

(62) Division of application No. 08/715,975, filed on Sep. 19, 1996, now Pat. No. 6,095,419.

(30) Foreign Application Priority Data

Dec. 26, 1995 (JP) .................................................. 7-339478

(51) Int. Cl.⁷ ...................................................... G06K 7/10
(52) U.S. Cl. .......................... 235/462.02; 235/7; 235/12; 235/454
(58) Field of Search ........... 235/462.02, 462.01–462.49, 235/454, 494

(56) References Cited

U.S. PATENT DOCUMENTS

| | | | |
|---|---|---|---|
| 4,782,220 | 11/1988 | Shuren | 235/463 |
| 5,128,527 | 7/1992 | Kawai et al. | 235/462 |
| 5,198,649 | 3/1993 | Brooks | 235/462 |
| 5,262,623 | 11/1993 | Batterman et al. | 235/454 |
| 5,262,625 | 11/1993 | Tom et al. | 235/462 |
| 5,311,000 | 5/1994 | Brooks | 235/462 |
| 5,388,049 | 2/1995 | Sansone et al. | 364/464.02 |
| 5,414,252 | 5/1995 | Shinoda et al. | 235/463 |
| 5,440,110 | 8/1995 | Brooks | 235/462 |
| 5,468,945 | 11/1995 | Huggett et al. | 235/462 |
| 5,481,098 | 1/1996 | Davis et al. | 235/462 |
| 5,686,715 | 11/1997 | Watanabe et al. | 235/436 |
| 6,095,419 | * 8/2000 | Watanabe et al. | 235/462.02 |
| 6,176,428 | * 1/2001 | Joseph et al. | 235/462.01 |

FOREIGN PATENT DOCUMENTS 3122782    5/1991    (JP) .

* cited by examiner

Primary Examiner—Karl D. Frech
Assistant Examiner—Jamara A. Franklin
(74) Attorney, Agent, or Firm—Arent Fox Kintner Plotkin & Kahn PLLC

(57) ABSTRACT

A demodulated data storage buffer is stored with bar width data sets obtained by scanning a coupon code with a scan optical system. A CPU first executes a demodulating process on these bar width data sets in accordance with a demodulation algorithm in a WPC code system. If an end guard bar (RGB) of the WPC code is contained in the demodulated data by the demodulating process, the demodulating process is executed on the same bar width data sets in accordance with a demodulation algorithm in a CODE 128 code system.

1 Claim, 17 Drawing Sheets

BAR CODE READING APPARATUS FOR READING PLURAL CODE SYSTEMS

This is a divisional application of U.S. patent application Ser. No. 08/715,975, filed Sep. 19, 1996 U.S. Pat. No. 6,095,419.

BACKGROUND OF THE INVENTION

1. Field of the Invention

The present invention relates generally to a bar code reading apparatus for reading a bar code consisting of blocks of data characters surrounded with discriminating bars having fixed patterns. The present invention relates more particularly to a bar code reading apparatus for reading a coupon code consisting of a combination of two types of bar codes each according to a different code system.

2. Description of the Prior Art

A practice of managing commercial goods, etc. by using bar codes has been popularized in recent years as represented by a POS system in a distribution business, etc. For example, in the POS system of a store such items of data as kinds, sales prices, etc. of the goods are encoded in a bar code format, and such data are printed on the goods. Then, the price is paid based on the read the bar code at a cash register, and the numbers of sold goods are added up in real time, which might be useful for stocking and purchasing managements.

By the way, the above bar code is classified roughly into a fixed length code such as a WPC code, a JAN code, a UPC code and an EAN code, and a variable length second code such as an ITF (Interleaved Two of Five) code, CODE 39, NW 7 and CODE 128. FIG. 20 shows a structure of the WPC code as a fixed length code and a structure of the CODE 128 as a variable length code. As illustrated in FIG. 20, the WPC code has a start guard bar (LGB) attached to a left edge, a center bar (CB) inserted in an intermediate portion and an end guard bar (RGB) attached to a right edge. The WPC code includes a left block consisting of six data characters between the start guard bar and the center bar. The WPC code also includes a right block consisting of six data characters between the center bar and the end guard bar. These guard bars and the center bar have patterns previously fixedly determined by the WPC code system. The bar code reading apparatus is therefore capable of discriminating these guard bars and the center bar from other data and also recognizing this bar code as the WPC code. Further, the CODE 128 code has a start code attached to a left edge and a stop code attached to a right edge. The CODE 128 code includes a variable length data characters between the start code and the stop code. These start and stop codes have patterns previously fixedly determined by the CODE 128 code system. The bar code reading apparatus is therefore capable of discriminating the start and stop codes from other data and recognizing this bar code as the CODE 128 code.

As explained above, there must be a restriction in terms of the number of data characters of the fixed length code, and hence there must be a limit in terms of a quantity of data that can be encoded. Under such circumstances, there is used a coupon code in which the quantity of data to be encoded is increased by adding a variable length code as a supplemental code to the fixed length code. FIG. 20 illustrates an example of the coupon code in which the WPC code is set as a first code (the bar code on the left side), and the CODE 128 code is set as a second code (the bar code on the right side). The following is an explanation using an example of the thus structured coupon code.

The conventional bar code reading apparatus must scan the bar code at least twice as shown in FIG. 20 when reading the above coupon code. More specifically, bar width data (electrical data obtained by photoelectrically reading brightness/darkness of the bar code) obtained by a first bar code scan (1), is demodulated based on a demodulation algorithm according to the WPC code system. Subsequently, bar width data obtained by a next bar code scan (2) is demodulated based on the demodulation algorithm according to the CODE 128 code system. Then, there are repeatedly performed the bar code scan for effecting the demodulation based on the above WPC code system and the bar code scan for effecting the demodulation based on the CODE 128 code system. After completing the demodulation of the whole WPC code and the demodulation of the whole CODE 128 bar code, pieces of demodulated data of the two bar codes are combined, thereby the demodulated data corresponding to the coupon code are regenerated.

However, the above-mentioned conventional coupon code reading system has such a problem that a whole processing time is required too much because of serially switching over the bar code demodulation algorithm for every single bar code scan.

To be specific, when the demodulation algorithm based on the WPC code system is executed, only the demodulation algorithm in the WPC code system is executed on all bar width data obtained by the bar code scan effected that time. Accordingly, even if picked-up data of the second code is contained in the picked-up bar width data because of the scan trajectory of the bar code scan of that time passing through above the second code, the second code is by no means demodulated, but such data are recognized as only noises. Similarly, when the demodulation algorithm based on the CODE 128 code system is executed, only the demodulation algorithm based on the CODE 128 code system is executed on all bar width data obtained by the bar code scan of that time. Hence, even if the picked-up data of the WPC code are contained in the picked-up bar width data because of the scan trajectory of the bar code scan of that time passing through above the WPC code, the WPC code is by no means demodulated, and such data are recognized as only noises.

Thus, a certain bar code happens to be scanned, and the bar width data set is obtained. Even in such a case, if the code system of that bar code does not coincide with the code system of the demodulation algorithm executed that time, the same bar width data set is discarded without being demodulated. Further, the demodulating process executed that time comes to an absolute futility. A period of futility of the demodulating process occupies theoretically a half the entire demodulating process period, and consequently the whole processing time elongates in the conventional bar code reading system.

In particular, the second code is defined as a truncate label having its narrow width. Accordingly, there must be extremely a small number of bar width data sets each containing both of the start code and the stop code among the bar width data sets obtained by scanning the bar code in a variety of directions with, e.g., a fixed type scanning device. Hence, if the bar width data sets corresponding to the whole second code with an originally low probability to be obtained come to the futility, the whole processing time further elongates.

SUMMARY OF THE INVENTION

It is a primary object of the present invention, which was devised in view of the above problems inherent in the prior art, to provide a bar code reading apparatus capable of, when reading a coupon code consisting of plural types of bar codes each belonging to a different code system, performing a demodulating process at a high efficiency and reducing a processing time as a whole.

To accomplish the object given above, according to a first aspect of the present invention, a bar code reading apparatus reads a code composed of a first bar code in which data based on a first code system is put between discriminating bars having a fixed pattern and a second bar code in which data based on a second code system is contained, which are arranged in one direction. The bar code reading apparatus comprises a scanning unit for scanning a surface of object to detect a bright/dark pattern along a trajectory of a scan, and a first discriminating bar detecting unit for detecting a pattern corresponding to the discriminating bar of the first bar code that is disposed on the side adjacent to the second bar code from the bright/dark pattern detected by the scanning unit. The bar code reading apparatus also comprises a demodulating unit for demodulating the bright/dark pattern detected by the scanning unit in accordance with the first code system, and for demodulating the bright/dark pattern in accordance with the second code system when the first discriminating bar detecting unit detects the pattern corresponding to the discriminating bar of the first bar code that is disposed on the side adjacent to the second bar code.

In the bar code reading apparatus according to the first aspect of the present invention, the scanning unit detects a bright/dark pattern along the trajectory on the surface of the object. The first discriminating bar detecting unit detects the pattern corresponding to the discriminating bar of the first bar code that is disposed on the side adjacent to the second bar code. The demodulating unit demodulates the bright/dark pattern detected by the scanning unit in accordance with the first code system. As a result of this demodulation, the data encoded into the first bar code is decoded. Further, when the first discriminating bar detecting unit detects the pattern corresponding to the discriminating bar of the first bar code that is disposed on the side adjacent to the second bar code, the demodulating unit switches over the demodulation algorithm to the second code system and thus demodulates the bright/dark pattern. As a consequence of this, the data encoded into the second bar code is decoded on the basis of the same bright/dark pattern.

According to a second aspect of the present invention, the bar code reading apparatus in the first aspect of the invention further comprises a second discriminating bar detecting unit for detecting the discriminating bar of the second bar code. The demodulating unit demodulates the bright/dark pattern detected by the scanning unit in accordance with the second code system also when the second discriminating bar detecting unit detects the discriminating bar of the second bar code. With this operation, even when the bright/dark pattern is detected by scanning only the second bar code, the demodulation can be done without discarding it.

According to a third aspect of the present invention, the bar code reading apparatus according to the first aspect of the invention further comprises a first bar code synthesizing unit for, when the demodulating unit demodulates respectively an item of data corresponding to a part of the first bar code including one discriminating bar and an item of data corresponding to a part of the first bar code including the other discriminating bar, synthesizing these items of data to regenerate the data corresponding to the whole first bar code.

According to a fourth aspect of the present invention, the bar code reading apparatus according to the third aspect of the invention further comprises a second bar code synthesizing unit for, when the demodulating unit demodulates respectively an item of data corresponding to a part of the second bar code including one discriminating bar and an item of data corresponding to a part of the second bar code including the other discriminating bar, synthesizing these items of data to regenerate the data corresponding to the whole second bar code.

According to a fifth aspect of the present invention, in the bar code reading apparatus according to the fourth aspect of the invention, the first bar code synthesizing unit and the second bar code synthesizing unit perform the synthesization on a condition that each of the discriminating bars is attached outside with a margin having a predetermined width.

According to a sixth aspect of the present invention, in the bar code reading apparatus according to the fifth aspect of the invention, the first bar code synthesizing unit and the second bar code synthesizing unit perform the synthesization irrespective of the condition if no margin having the predetermined width is attached to both of the discriminating bar of the first bar code positioned opposite to the second bar code and the discriminating bar of the second bar code positioned opposite to the first bar code. With this construction, if the margin width is not determined to be over the predetermined width because of an occurrence of optical noises in the margin, the demodulated data can be prevented from being discarded without the synthesization.

According to a seventh aspect of the present invention, a bar code reading apparatus reads a code composed of a first bar code in which data based on a first code system is surrounded with discriminating bars having a fixed pattern, and the second bar code in which data based on a second code system is surrounded with discriminating bars having a fixed pattern, which are arranged in one direction. The bar code reading apparatus comprises a scanning unit for scanning a surface of object to detect a bright/dark pattern along a trajectory of a scan, and a discriminating bar detecting unit for detecting a pattern corresponding to the discriminating bar of the first bar code and a pattern corresponding to the discriminating bar of the second bar code respectively from the bright/dark patterns, which are positioned at outer edges of the codes composed of the first bar code and the second bar code. The bar code reading apparatus also comprises a demodulating unit for, when the discriminating bar detecting unit detects the pattern corresponding to the discriminating bar of the first bar code and the pattern corresponding to the discriminating bar of the second bar code, demodulating the bright/dark pattern detected by the scanning unit in accordance with the first code system, thereafter demodulating the same bright/dark pattern in accordance with the second code system.

In the bar code reading apparatus according to the seventh aspect of the present invention, the scanning unit detects the bright/dark pattern along the trajectory on the surface of the object. The discriminating bar detecting unit reads the pattern corresponding to the discriminating bar of the first bar code and the pattern corresponding to the discriminating bar of the second bar code respectively from the bright/dark patterns detected by the scanning unit. When the discriminating bar detecting unit detects the pattern corresponding to the discriminating bar of the first bar code and the pattern corresponding to the discriminating bar of the second bar code, the demodulating unit demodulates the bright/dark pattern detected by the scanning unit in accordance with the first code system and, after this demodulation, immediately switches over the demodulation algorithm to the second code system and demodulates the same bright/dark pattern in accordance with the second code system. As a result, the data encoded into the first bar code and the data encoded into the second bar code are decoded based on the same b right/dark pattern at one time.

The number of discriminating bars included in the respective bar codes may be 2 or 3. If three discriminating bars are provided, the data characters may be interposed between the respective discriminating bars. A variable length codes such as, e.g, an ITF code, NW-7, CODE 39 and CODE 128 are examples of the former. Further, a fixed length codes such as, e.g., a WPC code, a JAN code and an EAN code examples of the latter. These bar codes may be arbitrarily combined. For example, the first bar code may be the WPC code, and the second bar code may be set as the code 128 BAR CODE.

The scanning unit repeatedly performs the scan, which may be optical scan by using a scan optical system. Further, it is desirable that this scanning unit be constructed to perform the scan in a different direction each time. Note that the scanning unit may execute the scan in an arbitrary direction and therefore may starts the scan from the side of the first bar code or from the side of the second bar code.

The demodulating unit may demodulate the first bar code or the second bar code at a stroke or may respectively demodulate the bright/dark patterns obtained by partially scanning the respective bar codes, thereafter synthesize these pieces of data into one set of data. The demodulating unit may perform the synthesization on a condition that a margin having a predetermined width is attached to the discriminating bars of each bar code. If both of the margins attached to the discriminating bars positioned at both edges of the coupon code are narrower than the predetermined width, the demodulating unit may perform the synthesization regarding optical noises occurred.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Next, embodiments of the present invention will hereinafter be discussed with reference to the accompanying drawings.

First Embodiment

Figure 1:
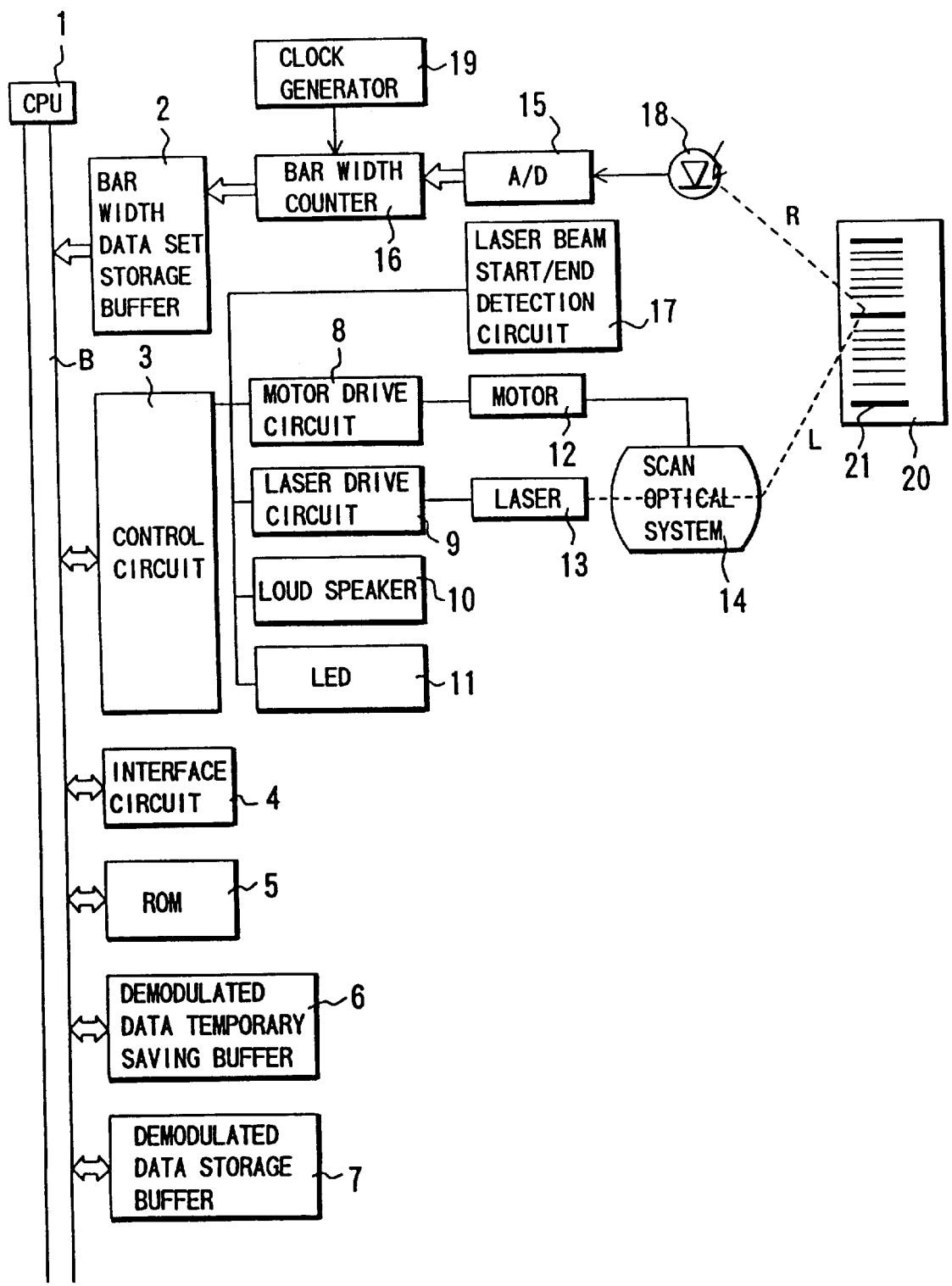
FIG. 1 is a block diagram illustrating a bar code reading apparatus in a first embodiment of the present invention.

FIG. 1 is a block diagram schematically illustrating a construction of a bar code reading apparatus in a first embodiment of the present invention. The bar code reading apparatus in the first embodiment is an apparatus for reading a bar code 21 on a goods 20, into which data are encoded based on the WPC code format and the CODE 128 format. (Whole Construction)

Referring to FIG. 1, a CPU 1 is connected via a bus to a bar width data set storage buffer 2, a control circuit 3, an interface circuit 4, a ROM 5, a demodulated data temporary saving buffer 6 and a demodulated data storage buffer 7. This CPU 1 controls the whole bar code reading apparatus and executes a data demodulation process to demodulate the bar width data set obtained by reading the bar code 21 printed on the surface of the goods 20.

The ROM 5 is a read-only memory stored with a bar code recognizing/demodulating process program which is to be executed by the CPU 1. The interface circuit 4 is a circuit for controlling a status of a bus B for connecting the CPU 1 to other circuit and for controlling a data transmission to an outside device.

The control circuit 3 is a circuit for controlling a motor drive circuit 8, a laser drive circuit 9, a loud speaker 10, a light emitting diode (LED) 11 and a laser beam start/end detecting circuit 17. This motor drive circuit 8 drives a motor 12 to rotate a polygon mirror (which is not shown) constituting a scan optical system 14. Further, the laser drive circuit 9 drives a semiconductor laser 13 to emit laser beams L. Further, the loud speaker 10 emits a voice indicating a completion of reading (demodulating) the bar code. The light emitting diode 11 is a display element for displaying data such as a sales price, etc. of the goods 20, which are obtained as a result of the demodulation of the bar code.

The laser beams L emitted from the semiconductor laser 13 are made incident on the scam optical system 14 and deflected by this scan optical system 14. More specifically, the scan optical system 14 deflects the laser beams L in one direction by use of the polygon mirror (not shown) rotated by the motor 12. A plurality of fixed mirrors are fixed on the side opposite to the polygon mirror. Accordingly, the laser beams L deflected by the polygon mirror are re-reflected in various direction by the respective fixed mirrors, whereby the deflecting direction (which is the scan direction) of the laser beams L is changed to a variety of directions. More specifically, the scan in a first direction is effected by a first fixed mirror during a such a period that a rotational angle of an unillustrated polygon mirror falls within a range of angles $\theta_0$–$\theta_1$. The scan in a second direction is effected by a second fixed mirror during such a period that the rotational angle of the polygon mirror falls within a range of angles $\theta_0$–$\theta_1$. The scan in an n-th direction is performed by an n-th fixed mirror during such a period that the rotational angle of the polygon mirror falls within a range of angles $\theta_{(n-1)}$–$\theta_n$. When the polygonal mirror is further rotated, the laser beams L shift to an adjacent reflecting surface, and the scans are again performed in the first through n-th directions. The scan in each of such directions is called "one scan". Note that the laser beam start/end detecting circuit 17 serving as a start-of-scan detecting unit and an end-of-scan detecting unit as well always monitors the rotational angle of the unillustrated polygon mirror that rotates in that way, and detects the fact that a next scan is started upon an end of one scan each time this rotational angle becomes $\theta_0$, $\theta_1$ . . . , $\theta_n$.

When the thus scanning laser beams L strike on the surface (containing a bar code 21) of the goods 20, the laser beams L are irregularly reflected from the surface, and some of reflected beams R are received by the light receiving element (which is a photo diode) 18. The light receiving element 18 outputs electric currents corresponding to brightness and darkness of the reflected light beams R received. An A/D converter 15 compares the electric current outputted by the light receiving element 18 with a predetermined threshold value and converts the current into a binary signal. This binary signal indicates "H" level when an intensity of the reflected beams R corresponds to a reflectivity of the black bar in the bar code 21 and "L" level when the intensity of the reflected beams R corresponds to a reflectivity of the white bar in the bar code 21.

A bar width counter 16 measures a period from a rise timing of the binary signal to a fall timing thereof (which is expected to correspond to a width of the black bar in the bar code 21). The bar width counter 16 also measures a period from the fall timing of the binary signal to the rise timing thereof (which is expected to correspond to a width of the white bar in the bar code 21). Note that the bar width counter 16 counts the number of clocks inputted from a clock generator 19 for measuring the time corresponding to each of those bar widths. Picked-up data of the respective bars that are outputted from the bar width counter 16 take such a form that the count value and a color discriminating signal indicating the white or the black are combined. Such picked-up data are consecutively outputted each time the laser-beam is scanned. A series of the picked-up data that are thus consecutively outputted during each scan are called a "bar width data set (corresponding to the bright/dark pattern)". The semiconductor laser 13, the scan optical system 14, the light receiving element 18, the A/D converter 15 and the bar width counter 16, which are described above, correspond to a scan unit.

The bar width data set storage buffer 2 temporarily stores the bar width data set. This bar width data set storage buffer 2 sequentially stores the bar width data set inputted from the bar width counter 16 and transfers the bar width data set piece by piece in the sequence in which the data set has been stored in response to a request from the CPU 1.

The demodulated data temporary saving buffer 6 is a memory for storing the demodulated bar width data set. Further, the demodulated data storage buffer 7 is a memory for storing the demodulated data corresponding to the whole bar code with its synthesization completed.

(Demodulation Algorithm)

Figures 8, 9:
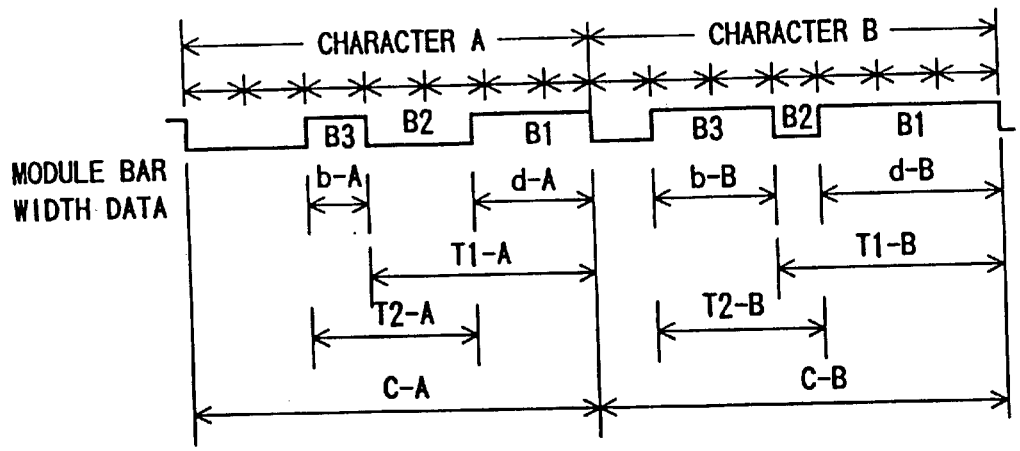
FIG. 8 is a diagram showing a structure of characters in a WPC code.
FIG. 9 is a distance demodulation table

Given next is an explanation of an outline of a general algorithm for demodulating the WPC code (a first bar code in which the data according to a first code system are surrounded by identification bars of fixed patterns). Each character in the WPC code is, as illustrated in FIG. 8, composed of a combination of two white bars and two black bars which are formed with color of each of seven modules (each having a unit length) allocated white or black. A demodulating unit of the CPU 1 calculates a sum length (which is called a T1 module) of a length of a tail black bar (B1) of each character and a length of a white bar (B2) just anterior thereto. The same demodulating unit calculates also a sum length (which is called a T2 module) of a length of the white bar (B2) and a length of a black bar (B3) just anterior thereto. These T1 and T2 modules are referred to as a "δdistance". Then, the demodulating unit of the CPU 1 reads corresponding data on the basis of a module number of each of the T1 and T2 modules with reference to a distance demodulation table shown in FIG. 9. Note that the reference symbol "E-" of each item of data shown in FIG. 9 represents a value of an even-numbered parity, while "O-" designates a value of an odd-numbered parity.

Figures 10, 11:
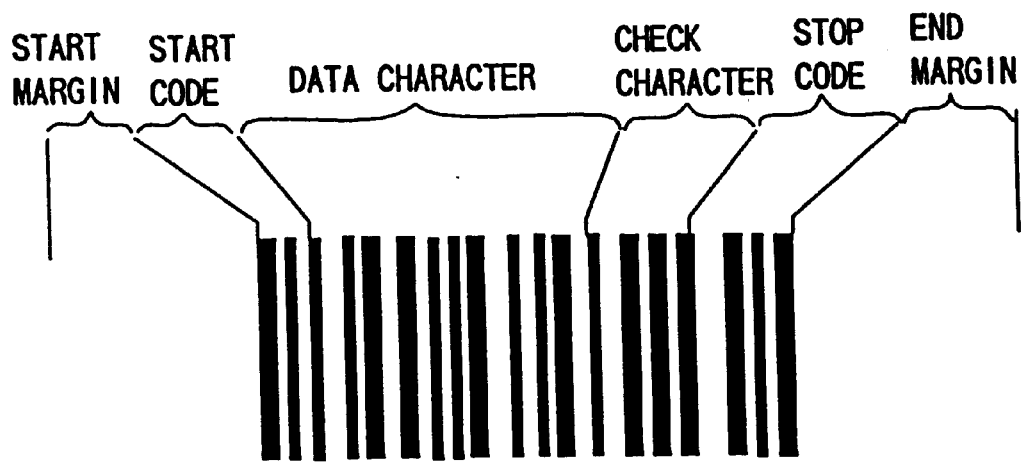
FIG. 10 is a bar width demodulation table.
FIG. 11 is a diagram showing a structure of CODE 128.

Incidentally, in the distance demodulation table shown in FIG. 9, in the case that the number of modules included in each of the T1 and T2 modules is 3 or 4 there are two kinds of corresponding data are prepared, and any one of these items of data can not be therefore specified. Hence, in this case, the demodulating unit of the CPU 1 specifies which data it is on the basis of the module number of the black bar (B1) and the black bar (B3) with reference to a bar width demodulation table shown in FIG. 10. For example, the character A and the character B shown in FIG. 8 are demodulated if both are "02" or "8" with reference to the distance demodulation table shown in FIG. 9. Further, the character A is specified as "02", while the character B is specified as "08" with reference to the bar width demodulation table shown in FIG. 10.

(Margin Check)

Next, a method of checking a margin that is executed in this embodiment will be explained.

To start with, in the case of the WPC code, a start margin is formed outside the start guard bar. An end margin is formed outside the end guard bar. Widths (Bn) of the start and end margins are regulated as follows on the basis of a width (T1) of T1 module and a width (T2) of the T2 module of the respective guard bars.

$$Bn > 3 \cdot T1$$

and $$Bn > 3 \cdot T2$$

Accordingly, if a white area detected outside each bar is over 3 times as large as the width of the T1 module within the respective bars and also over 3 times as large as the width of the T2 module within the respective bars, the margin is recognized to be effective.

Next, in CODE 128 (the second bar code in which the data according to the second code system are surrounded by discriminating bars of the fixed patterns), a concept of the δ distance is not used, and hence the margin check is performed based on a width of the start or stop code. More specifically, if each of the widths of the start margin formed outside the start code and of the end margin formed outside the stop code is over a fixed constant of the width of the start or stop code (see FIG. 11), the margin is recognized to be effective.

A result of the margin check executed in the above-mentioned manner is used for checking (modulus 10 check) whether or not the demodulated data corresponding to the whole bar codes can be reproduced by synthesizing fragments of the demodulated data obtained by reading the respective bar codes.

(Bar Code Recognizing/Demodulating Process)

Next, particulars of a bar code recognizing/demodulating process program to demodulate a coupon code consisting of a WPC code and a CODE 128 code actually executed by a CPU 1 (a first discriminating bar detecting unit, a demodulating unit, a second discriminating bar detecting unit, a first bar code synthesizing unit, and second bar code synthesizing unit), will be explained with reference to flowcharts shown in FIGS. 2 through 7.

Figure 2:
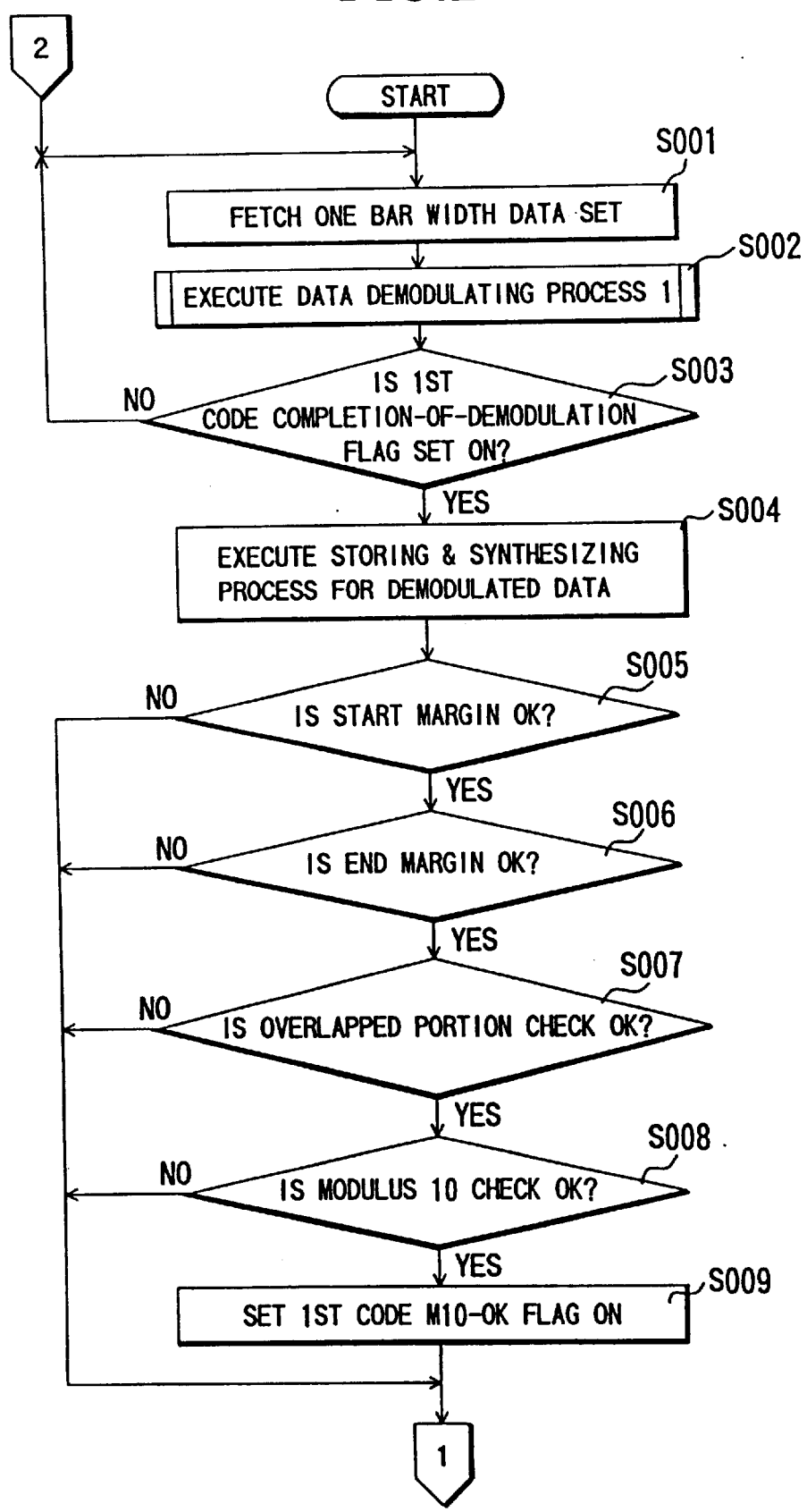
FIG. 2 is a flowchart showing a bar code recognition/demodulation processing program executed by a CPU shown in FIG. 1.
Figure 3:
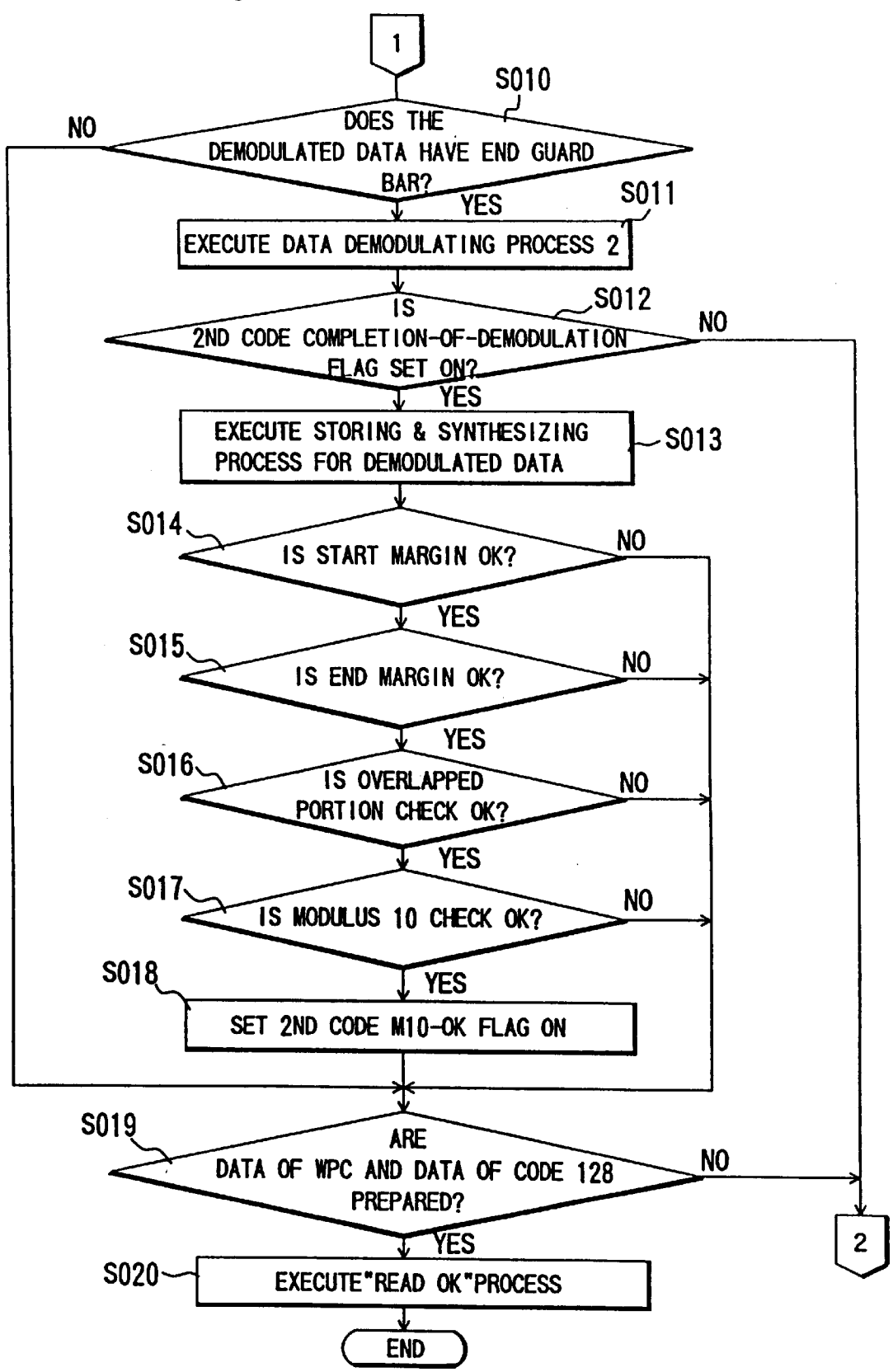
FIG. 3 is a flowchart showing a bar code recognition/demodulation processing program executed by the CPU shown in FIG. 1.

FIGS. 2 and 3 show the flowcharts of a main routine of the bar code recognizing/demodulating process. This main routine starts when the bar width data set storage buffer 2 is stored with a bar width data set as a result of scanning the code after a main power is supplied to the bar code reading apparatus. Fetched in first step S001 is one oldest bar width data set out of the bar width data set storage buffer 2.

Figure 4:
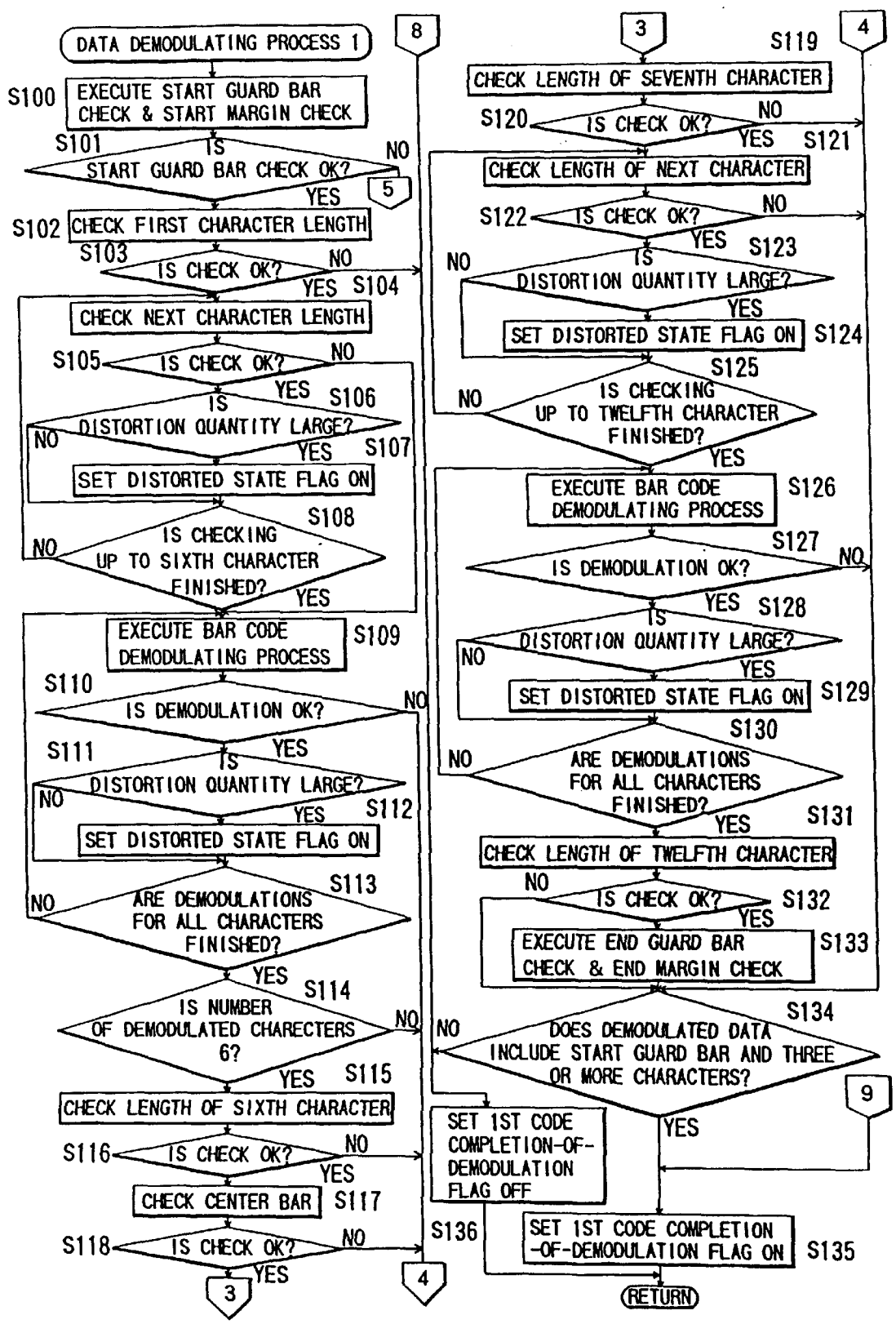
FIG. 4 is a flowchart showing a data demodulating process 1 executed in step S002 of FIG. 2.
Figure 5:
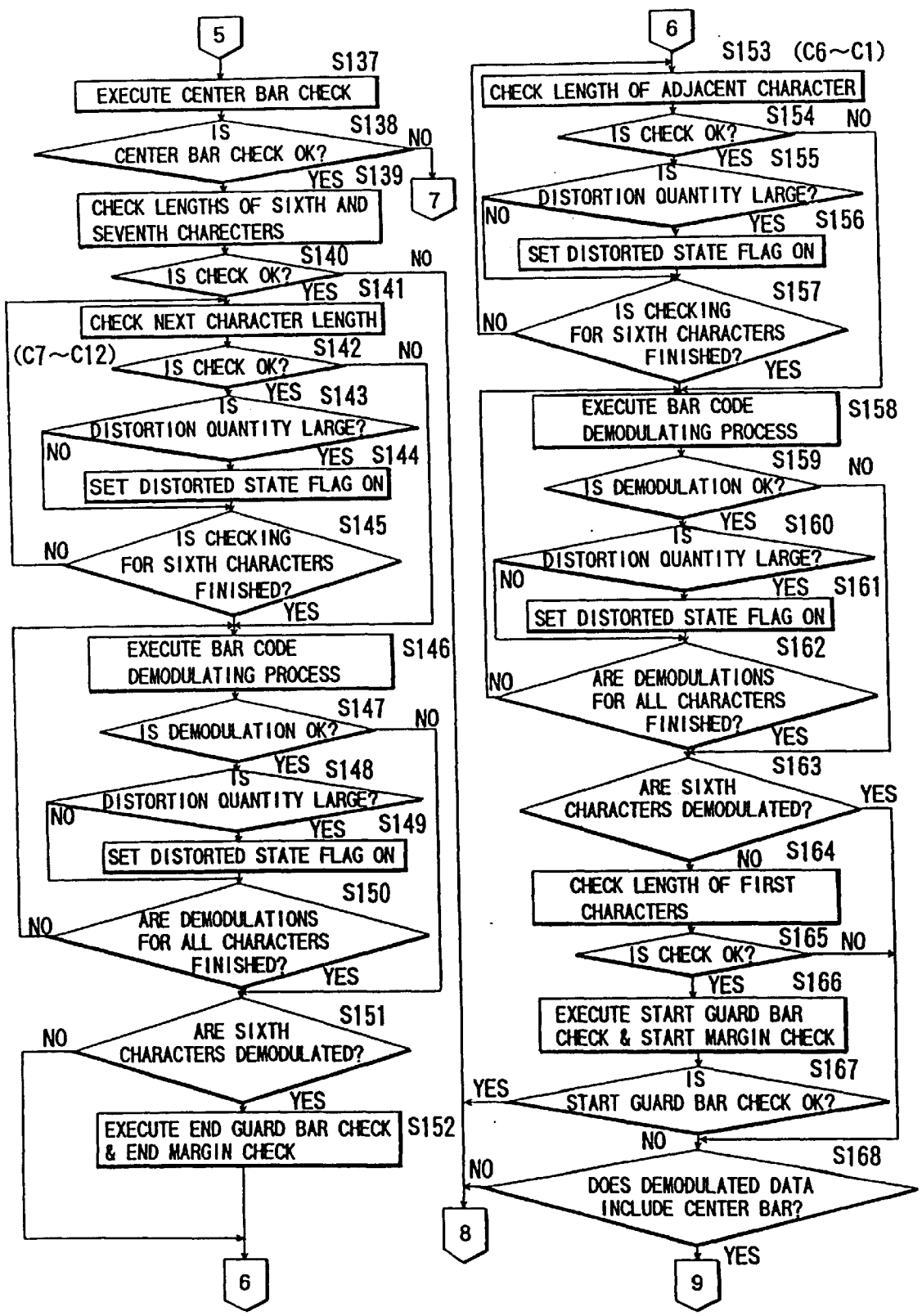
FIG. 5 is a flowchart showing the data demodulating process 1 executed in step S002 of FIG. 2.
Figure 6:
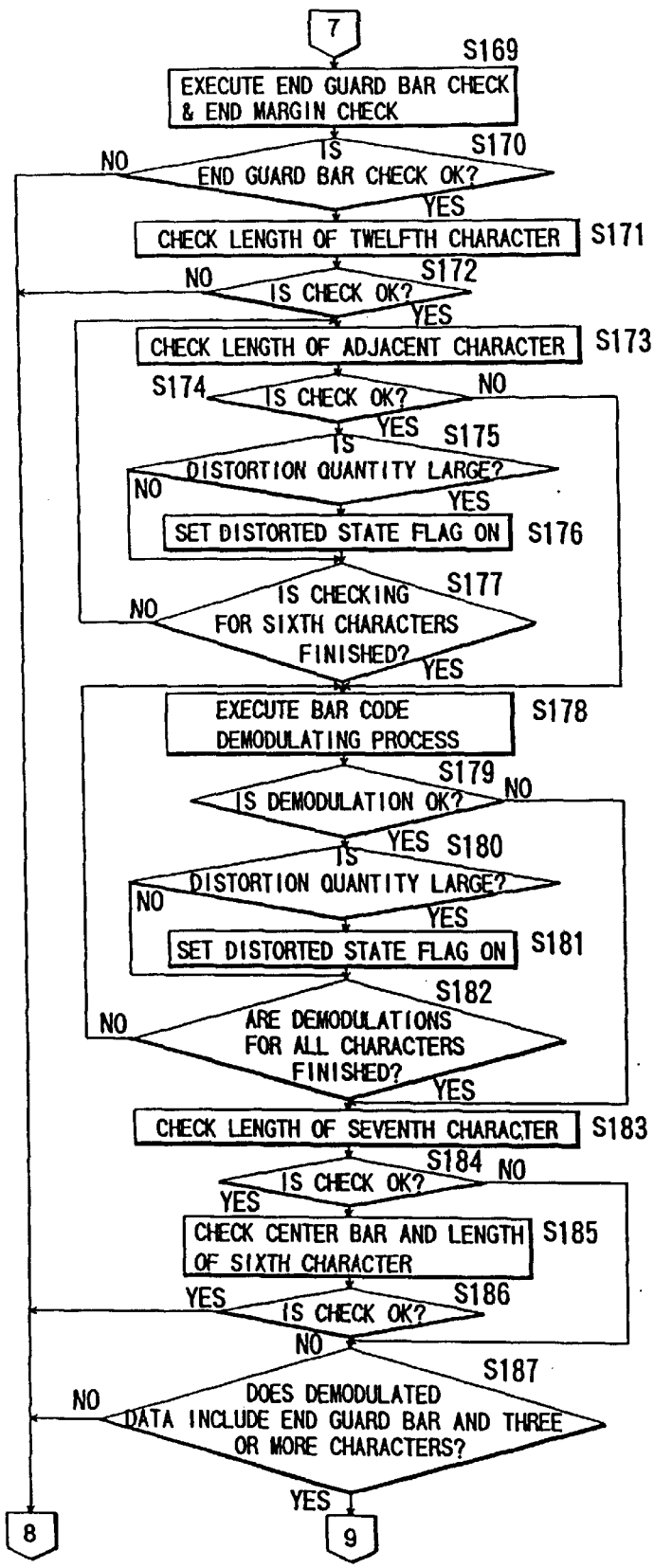
FIG. 6 is a flowchart showing the content of the data demodulating process 1 executed in step S002 of FIG. 2.

In next step S002, a data demodulating process (a data demodulating process 1) according to the demodulation algorithm based on the WPC code system (a first code system) is executed on the thus fetched bar width data set (corresponding to the demodulating unit). FIGS. 4 to 6 are flowcharts showing a subroutine of this data demodulating process 1. In first step S100 after entering this subroutine, there are checked whether the fetched bar width data set contains a pattern of black/white/black having same width which corresponds to the start guard bar (LGB) (a start guard bar check), and whether this pattern corresponding to the start guard bar (LGB) is attached with the start margin having a regular width (a start margin check).

In next step S101, a result of the start guard bar check in step S100 is examined. If the start guard bar is contained, the processing proceeds to step S102. Processes in steps S102 through S134 are processes for demodulating characters as far as possible to be demodulated with the start guard bar serving as a starting point.

In step S102, a length of a first character (next to the start bar on the side toward the center bar) is checked. More specifically, it is checked whether or not a total sum of bar width count values of four bars forming the first character is in a predetermined range. Then, if the length of the first character is not in the vicinity of the fixed value (S103), the bar width data set to be processed is conceived as a data set based on a pattern other than the bar code. In this case, a "1ST code completion-of-demodulation flag" is reset in step S136, and this subroutine is ended. Contrastingly, if the length of the first character is in the vicinity of the fixed value (S103), the processing proceeds to step S104.

In step S104, a length of the next character (which is defined as second character next to the first character in the initial status) is checked. Then, if the length of this character is not in the vicinity of the fixed value (S805), the processing proceeds to step S109 to demodulate the characters in the first block of which length has hitherto been determined to be in the vicinity of the fixed value. Contrastingly, if the length of the same character is in the vicinity of the fixed value (S105), whether a distortion quantity of the character is large is checked in step S106. Then, if the distortion quantity is small, the processing proceeds directly to step S108. Whereas, if the distortion quantities is large (i.e., if a ratio between items of bar width data (which are bright/dark data) corresponding to the respective characters exceeds a fixed range, or if a ratio between items of bar width data (which are bright/dark data) corresponding to the respective modules exceeds a fixed range, the processing proceeds to step S108 after setting a "distorted state flag" in step S107.

Checked in step S108 is whether the checking processes of the lengths of the characters are finished up to the sixth character (adjacent to the center bar on the side toward the start bar). Then, when the checks of the lengths of the characters finished up to the sixth character, the processing proceeds to step S109 to demodulate the six characters constituting the first block. Whereas, if the checks of the lengths of characters are not yet finished up to the sixth character, the processing is returned to step S104 to check a length of the next character adjacent thereto.

In step S109, the character closest to the start guard bar is fetched out of the characters of which lengths are determined to be in the vicinity of the fixed value in steps S103 and S105, and the demodulating process for the fetched character is executed (the fetched character is replaced with corresponding data in the WPC code system). In next step S110, whether the demodulating process in step S109 succeeds or not is checked. Then, if the demodulating process does not succeed, the processing proceeds to step S134 to finish this subroutine. If the demodulating process succeeds, the processing proceeds to step S111. In step S111, whether the distortion quantity of the character is large is checked. Then, if the distortion quantity is small, the processing proceeds directly to step S113. Whereas, if the distortion quantity of the character is large, the "distorted state flag" is set in step S112, and the processing proceeds to step S113. Checked in step S113 is whether there are completed the demodulating processes corresponding to the number of all the characters of which lengths are determined to be in the vicinity of the fixed value in the character length checking in steps S103 and S105. Then, if the demodulating processes for all the characters are not yet completed, the processing returns to step S109 to execute the demodulating process for the next adjacent character. In contrast with this, if the demodulating processes for all the characters are completed, the processing proceeds to step S114.

Checked in step S114 is whether the number of the characters that has been demodulated by the demodulating process in step S109 is 6. Then, if the number is less than 6, there is nothing but such a possibility that the bar width data set is obtained by divided-reading only a part of the block of the WPC code (which is hereinafter termed a "dividedly read bar width data set"), and hence the processing proceeds to step S134 to finish this subroutine. Contrastingly, if the number of characters that has been demodulated is 6, the processing proceeds to step S115.

In step S115, the length of the sixth character is again checked. Subsequently, if the length of the sixth character is not in the vicinity of the fixed value (S116), the processing proceeds to step S134. If the length of the sixth character is in the vicinity of the fixed value (S116), the center bar is checked in step S117. This check of the center bar is a process of checking whether the character next adjacent to the sixth character coincides with a predetermined pattern set as the center bar. Then, when a desirable result of the center bar checking (S118) is obtained, the processing proceeds to step S119. Contrastingly, when no desirable result of the center bar checking is obtained (S118), the bar width data set is determined to be the one obtained by the divided-reading, and the processing therefore proceeds to step S134 to finish this subroutine.

In step S119, a length of a seventh character (next to the center bar on the side toward the end guard bar) is checked. Then, if the length of the seventh character is not in the vicinity of a fixed value (S120), the bar width data set is determined not to be the bar width data set obtained by continuously reading the whole WPC code (hereinafter referred to as a "continuously read bar width data set"), and hence the processing proceeds to step S134 to finish this subroutine. Whereas, if the length of the seventh character is in the vicinity of the fixed value (S120), the processing proceeds to step S121.

Checked in step S121 is a length of the next character (which is an eighth character next to the seventh character in the initial status). Then, if the length of the eighth character is not in the vicinity of a fixed value (S122), the bar width data set is determined not to be the bar width data set obtained by the continuously reading, and hence the processing proceeds to step S134 to finish this subroutine. Whereas if the length of the eighth character is in the vicinity of the fixed value (S122), whether the distortion quantity of the character is large is checked in step S123. Subsequently, if the distortion quantity of the character is small, the processing proceeds directly to step S125. If the distortion quantity of the character is large, however, the processing proceeds to step S125 after setting the "distorted state flag" in step S124. Checked in step S125 is whether the checking of lengths of characters are finished up to a twelfth character (adjacent to the end guard bar on the side toward the center bar). Then, if the checks of the lengths of the characters up to the twelfth character are finished, the processing proceeds to step S126 to demodulate six pieces of characters constituting a second block. Whereas if the checks of the lengths of the characters are not yet finished up to the twelfth character, the processing returns to step S121 to check a length of the next character adjacent thereto.

In step 126, the character closest to the center bar is fetched out of the characters of which lengths are determined to be in the vicinity of the fixed value in steps S120 and S122, and the demodulating process for the fetched character is executed (the fetched character is replaced with corresponding data in the WPC code system). In next step S127, whether the demodulating process in step S126 succeeds or not is checked. Then, if the demodulating process does not succeed, the processing proceeds to step S134 to finish this subroutine. If the demodulating process succeeds, the processing proceeds to step S128. In step S128, whether the distortion quantity of the character is large is checked. Then, if the distortion quantity of the character is small, the processing proceeds directly to step S130. Whereas, if the distortion quantity of the character is large, the "distorted state flag" is set in step S129, and the processing proceeds to step S130. Checked in step S130 is whether there are completed the demodulating processes corresponding to the number of the characters of which lengths are determined to be in the vicinity of the fixed value in the character length checking in steps S120 and S122. Then, if the demodulating processes for all the characters are not yet completed, the processing returns to step S126 to execute the demodulating process for the next adjacent character. In contrast with this, if the demodulating processes for all the characters are completed, the processing proceeds to step S131.

In step S131, the length of the twelfth character is again checked. Subsequently, if the length of the twelfth character is not in the vicinity of the fixed value (S132), the processing proceeds to step S134. If the length of the twelfth character is in the vicinity of the fixed value (S132), the end guard bar (RGB) and the end margin are checked in step S133. This check of the end guard bar is a process of checking whether the character next adjacent to the twelfth character coincides with a predetermined pattern set as the end guard bar. Further, the end margin check is a check as to whether this end guard bar (RGB) is attached with an end margin having a regular width or not. After executing these checks, the processing proceeds to step S134.

Checked in step S134 is whether the data completely demodulated in steps S109 and S126 include the start guard bar and three or more characters. Then, if the completely demodulated data include the start guard bar and the three or more characters, the data with a completion of demodulation can be determined to be the data set obtained by at least the divided-reading, and hence the "1ST code completion-of-demodulation flag" is set in step S135, thus finishing this subroutine. Contrastingly, if the same data do not include the start guard bar and the three or more characters, a reliability on the data is comparatively low, the "1ST code completion-of-demodulation flag" is reset in step S136, and this subroutine is finished.

On the other hand, when it is judged that the bar width data set does not include the start guard bar, there is no such possibility that the bar width data set to be processed is obtained by the continuously reading, the processing proceeds to step S137. In step S137, whether the bar width data set includes the center bar is checked. Then, if the center bar is included therein (S138), the processing proceeds to step S139. Steps S139 through S168 involve processes for demodulating the characters as far as possible to be demodulated in bilateral directions with the center bar as the center point.

In step S139, the lengths of the sixth and seventh characters are checked. Then, if the length of the sixth and seventh characters are not in the vicinity of the fixed value (S140), the bar width data set to be processed is conceived as a data set based on a pattern other than the bar code. In this case, and the "1ST code completion-of-demodulation flag" is reset in step S136, and this subroutine comes to an end. In contrast with this, if any one of the lengths of the sixth and seventh characters is in the vicinity of the fixed value (S140), the processing proceeds to step S141.

Checked in step S141 is a length of the next character (which is the seventh character in the initial status) of the center bar on the side toward the end guard bar. Subsequently, if the length of the same adjacent character is not in the vicinity of the fixed value (S142), the processing proceeds to step S146 to demodulate the characters in the second block of which length has hitherto been determined to be in the vicinity of the fixed value. Contrastingly, if the length of this character is in the vicinity of the fixed value (S142), whether the distortion quantity of the character is large or not is checked in step S143. Then, if the distortion quantity of the character is small, the processing proceeds directly to step S145. Whereas, if the distortion quantity of the character is large, the "distorted state flag" is set in step S144, and thereafter the processing proceeds to step S145. Checked in step S145 is whether the checking of the lengths of the six characters forming the second block is ended. Then, if the checks of the lengths of the six characters are finished, the processing proceeds to step S146 to demodulate those six characters. Whereas, if the checks of the lengths of the six characters are not yet finished, the processing returns to step S141 to check a length of the next adjacent character.

In step S146, the character closest to the center bar is fetched out of the characters of which lengths are determined to be in the vicinity of the fixed value in steps S142, and the demodulating process for the fetched character is executed (this character is replaced with corresponding data in the WPC code system). In next step S147, whether the demodulating process in step S146 succeeds or not is checked. Then, if the demodulating process does not succeed, the processing proceeds directly to step S151. If the demodulating process succeeds, the processing proceeds to step S148. In step S148, whether the distortion quantity of the character to be processed is large is checked. Then, if the distortion quantity of the character is small, the processing proceeds directly to step S150. Whereas, if the distortion quantity of the character is large, the "distorted state flag" is set in step S149, and the processing proceeds to step S150. Checked in step S150 is whether there are completed the demodulating processes corresponding to the number of all characters of which lengths are determined to be in the vicinity of the fixed value in the character length checking in step S142. Then, if the demodulating processes for all the characters are not yet completed, the processing returns to step S146 to execute the demodulating process for the next adjacent character. In contrast with this, if the demodulating processes for all the characters are completed, the processing proceeds to step S151.

Checked in step S151 is whether the number of the characters that has been demodulated by the demodulating process in step S146 is 6. Then, if the number is less than 6, the processing proceeds to step S154 to demodulate the characters included in the left block. Contrastingly if the number of the characters that have been demodulated is 6, the processing proceeds to step S152. In step S152, the end guard bar (RGB) and the end margin are checked. Then, the processing proceeds to step S153 to demodulate the characters included in the first block.

Checked in step S153 is a length of the adjacent character (which is the sixth character in the initial status) of the center bar on the side toward the start guard bar. Then, if the length of this adjacent character is not in the vicinity of the fixed value (S154), the processing proceeds to step S158 to demodulate the characters in the first block of which lengths has hitherto been determined to be in the vicinity of the fixed value. Contrastingly, if the length of the same character is in the vicinity of the fixed value (S154), whether the distortion quantity of the character is large is checked in step S155. Then, if the distortion quantity of the character is small, the processing proceeds directly to step S157. Whereas, if the distortion quantity of the character is large, the "distorted state flag" is set in step S156, and thereafter the processing proceeds to step S157. Checked in step S157 is whether the checking of the lengths of the six characters forming the first block is ended. Then, if the checks of the lengths of the six characters are finished, the processing proceeds to step S158 to demodulate those six characters. Whereas, if the checks of the lengths of the six characters are not yet finished, the processing returns to step S153 to check a length of the next adjacent character.

In step S158, the character closest to the center bar is fetched out of the characters of which lengths are determined to be in the vicinity of the fixed value in steps S155, and the demodulating process for the fetched character is executed (the same character is replaced with corresponding data in the WPC code system). In next step S159, whether the demodulating process in step S158 succeeds or not is checked. Then, if the demodulating process does not succeed, the processing proceeds directly to step S163. If the demodulating process succeeds, the processing proceeds to step S160. In step S160, whether the distortion quantity of the character is large is checked. Then, if the distortion quantity of the character is small, the processing proceeds directly to step S162. Whereas, if the distortion quantity of the character is large, the "distorted state flag" is set in step S161, and thereafter the processing proceeds to step S162. Checked in step S162 is whether there are completed the demodulating processes corresponding to the number of all characters of which lengths are determined to be in the vicinity of the fixed value in the character length checking in step S154. Then, if the demodulating processes for all the characters are not yet completed, the processing returns to step S158 to execute the demodulating process for the next character. In contrast with this, if the demodulating processes for all the characters are completed, the processing proceeds to step S163.

Checked in step S163 is whether the number of the characters that has been demodulated by the demodulating process in step S158 is 6. Then, if the number of the characters is 6, the processing proceeds to step S168. If less than 6, the processing proceeds to step S164.

In step S164, the length of the first character is checked. Then, if the length of the first character is not in the vicinity of the fixed value (which includes a case where the first character is lost) (S165), the processing proceeds to step S168. Whereas if the length of the first character is in the vicinity of the fixed value (S165), the start guard bar and the start margin are checked in step S166. Then, if the start guard bar is detected (S167), this is contradictory to the determination made in step S101, and hence the "1ST code completion-of-demodulation flag" is reset in step S136, thus finishing this subroutine. Whereas, if the start guard bar is not detected (S167), the processing proceeds to step S168.

Checked in step S168 is whether the completely demodulated data set has such a construction that characters are continuously linked to both sides of the center bar. Then, if the data set has the construction, the "completion-of-demodulation flag" is set in step S135, and thus subroutine is finished, Contrastingly, if the data set does have the above-described construction, this implies a situation that might hardly happen, and the reliability of the data set is low. Therefore, the "1ST code completion-of-demodulation flag" is reset in step S136, and this subroutine is ended.

On the other hand, when it is judged that the bar width data set does not include the center bar in step S138, there is no possibility that the bar width data set is the one obtained by reading only one-side block (hereinafter called a "block read bar width data set"), the processing proceeds to step S169. Performed in step S169 are an end guard bar check as to whether or not the bar width data set includes the end guard bar, and an end margin check as well. Then, if the end guard bar is not included therein (S170), the bar width data set is conceived as a data set based on a pattern other than the bar code. In this case, the "1ST code completion-of-demodulation flag" is reset in step S136, and this subroutine comes to an end. In contrast with this, if the bar width data set includes the end guard bar (S170), the processing proceeds to step S171. Steps S171 through S187 involve processes for demodulating the characters as far as possible to be demodulated in direction toward the center bar with the end guard bar as the starting point.

In step S171, the length of the twelfth character is checked. Subsequently, if the length of the twelfth character is not in the vicinity of the fixed value (S172), the bar width data set is conceived as a data set based on a pattern other than the bar code. In this case, the "1ST code completion-of-demodulation flag" is reset in step S136, and this subroutine comes to an end. In contrast with this, if the length of the twelfth character is in the vicinity of the fixed value (S172), the processing proceeds to step S173.

Checked in step S173 is a length of the adjacent character (which is an eleventh character in the initial status) on the side toward the center bar. Subsequently, if the length of the same adjacent character is not in the vicinity of the fixed value (S174), the processing proceeds to step S178 to demodulate the characters in the second block has hitherto been determined to be in the vicinity of the fixed value. Contrastingly, if the length of this character is in the vicinity of the fixed value (S174), whether the distortion quantity of the character is large or not is checked in step S175. Then, if the distortion quantity of the character is small, the processing proceeds directly to step S177. Whereas, if the distortion quantity of the character is large, the "distorted state flag" is set in step S176, and thereafter the processing proceeds to step S177. Checked in step S177 is whether the checking of the lengths of the six characters forming the second data block is finished. Then, if the checks of the lengths of the six characters are finished, the processing proceeds to step S178 to demodulate those six characters. Whereas, if the checks of the lengths of the six characters are not yet finished, the processing returns to step S173 to check a length of the next adjacent character.

In step S178, the character closest to the end guard bar is fetched out of the characters of which lengths are determined to be in the vicinity of the fixed value in steps S172 or S174, and the demodulating process for the fetched character is executed (the same character is replaced with corresponding data in the WPC code system). In next step S179, whether the demodulating process in step S178 succeeds or not is checked. Then, if the demodulating process does not succeed, the processing proceeds directly to step S183. If the demodulating process succeeds, the processing proceeds to step S180. In step S180, whether the distortion quantity of the character is large is checked. Then, if the distortion quantity of the character is small, the processing proceeds directly to step S182. Whereas, if the distortion quantity of the character is large, the "distorted state flag" is set in step S181, and the processing proceeds to step S182. Checked in step S182 is whether there are completed the demodulating processes corresponding to the number of all characters of which lengths are determined to be in the vicinity of the fixed value in the character length checking in step S172 or S174. Then, if the demodulating processes for all the characters are not yet completed, the processing returns to step S178 to execute the demodulating process for the next adjacent character. In contrast with this, if the demodulating processes for all the characters are completed, the processing proceeds to step S183.

In step S183, the length of the seventh character is checked. Then, if the length of the seventh character is not in the vicinity of the fixed value (which includes a case where the seventh character is lost) (S184), the processing proceeds to step S187. Whereas, if the length of the seventh character is in the vicinity of the fixed value (S184), the center bar and the length of the sixth character are checked in step S185. Then, if the center bar is detected, or if the length of the sixth character is in the vicinity of the fixed value (S186), this is contradictory to the determination made in step S138, and hence the "1ST code completion-of-demodulation flag" is erest in step S136, thus finishing this subroutine. Whereas, if the center bar is not detected (S186), the processing proceeds to step S187.

Checked in step S187 is whether the data completely demodulated in step S178 include the end guard bar and three or more characters. Then, if the completely demodulated data include the end guard bar and the three or more characters, the bar width data set to be processed can be determined to be the bar width data set obtained by at least the divided reading, and hence the "1ST code completion-of-demodulation flag" is set in step S135, thus finishing this subroutine. Contrastingly, if the same data do not include the end guard bar and the three or more characters, the reliability on the data is comparatively low, the "1ST code completion-of-demodulation flag" is reset in step S136, and this subroutine is finished.

In the main routine shown in FIG. 2 to which the processing is returned from the data demodulating process 1, it is checked in next step S003 whether the "1ST code completion-of-demodulation flag" is set in the RAM area within the CPU 1. This "1ST code completion-of-demodulation flag" is a flag set in step S135 (FIG. 4) in the data demodulating process 1 in step S002, and also a flag for indicating that at least any one of the guard bar and the center bar and the three or more data characters subsequent thereto within the WPC code are demodulated. When this "1ST code completion-of-demodulation flag" is not set, the processing returns to step S001 to execute the demodulating process by discarding the bar width data set which was fetched more recently in step S001 and taking a new bar width data set from the bar width data set storage buffer 2.

Whereas, if the "1ST code completion-of-demodulation flag" is set, in step S004, the demodulated data temporary saving buffer 6 is stored with the demodulated data, and the data synthesizing process is carried out (corresponding to a first bar code synthesizing unit). This synthesizing process is executed by applying each piece of demodulated data to the WPC format defined as a fixed format with a guard bar or/and a center bar (CB) contained in the demodulated data as clues. After effecting the synthesizing process, the processing proceeds to step S005.

Processes in steps S005 to S009 are a series of processes for executing a modulus 10 check. Checked in step S005 is whether the start margin is determined to have the predetermined width in the start margin check (S100, S166) with respect to the bar width data which was fetched most recently in step S001. Then, if the start margin is not determined to have the predetermined width (including a case where the start margin check is not performed), the processing proceeds directly to step S010.

Whereas, if the start margin is determined to have the predetermined width, it is checked in step S006 whether the end margin is determined to have the predetermined width in the end margin check (S133, S152, S169) with respect to the bar width data set which was fetched most recently in step S001. Then, if the end margin is not determined to have the predetermined width (including a case where the end margin check is not executed), the processing proceeds directly to step S010.

Whereas, if the end margin is determined to have the predetermined width in step S007, an overlapped portion is checked. This overlapped portion check involves a check as to whether or not the demodulated data (the data of the first bar code including one discriminating bar) having the start guard bar and the demodulated data (the data of the first bar code including the other discriminating bar) having the end guard bar are stored in the demodulated data temporary saving buffer 6, and same data characters of a predetermined number of digits are contained in both of those items of demodulated data. Then, if a result of checking the overlapped portion is NG (i.e., if there is not the demodulated data having the start guard bar or the demodulated data having the end guard bar, or alternatively if the same data characters of the predetermined number of digits are not contained in both of those items of demodulated data), the processing proceeds directly to step S010.

Whereas, if the result of checking the overlapped portion is OK (i.e., if the demodulated data temporary saving storage buffer 6 is stored with the demodulated data having the start guard bar and the demodulated data having the end guard bar, and the same data characters of the predetermined number of digits are contained in both of those items of demodulated data), whether the result of the modulus 10 check with respect to the WPC code is OK or not is checked in step S008. This modulus 10 check is a checking process of determining whether the demodulated data corresponding to the whole bar code are successfully acquired by the synthesizing process in step S004. If a result of this modulus 10 check is NG (indicating a failure of acquiring the demodulated data), the processing proceeds directly to step S010.

Contrastingly, if the result of the modulus 10 check is OK (indicating a success in the acquisition of the demodulated data), a 1ST code M10-OK flag is set in step S009. This 1ST code M10-OK flag indicates that the result of the modulus 10 check with respect to the WPC code is OK, i.e., that the demodulated data corresponding to the whole WPC code are obtained. As discussed above, in accordance with this embodiment, a condition for OK of the result of the modulus 10 check with respect to the WPC code is that both of the start margin and the end margin of the WPC code are effective. After setting the flag, the processing proceeds to step S010.

Checked in step S010 is whether or not the demodulated data obtained as a result of the data demodulating process 1 (S002) with respect to the bar width data set which was fetched most recently in step S001 has a pattern corresponding to the end guard bar (RGB, the discriminating bar of the first bar code that is arranged on the side adjacent to the second bar code) (corresponding to a first discriminating bar detecting unit). Then, if this item of demodulated data has no end guard bar (RGB), the processing proceeds directly to S019.

Figure 7:
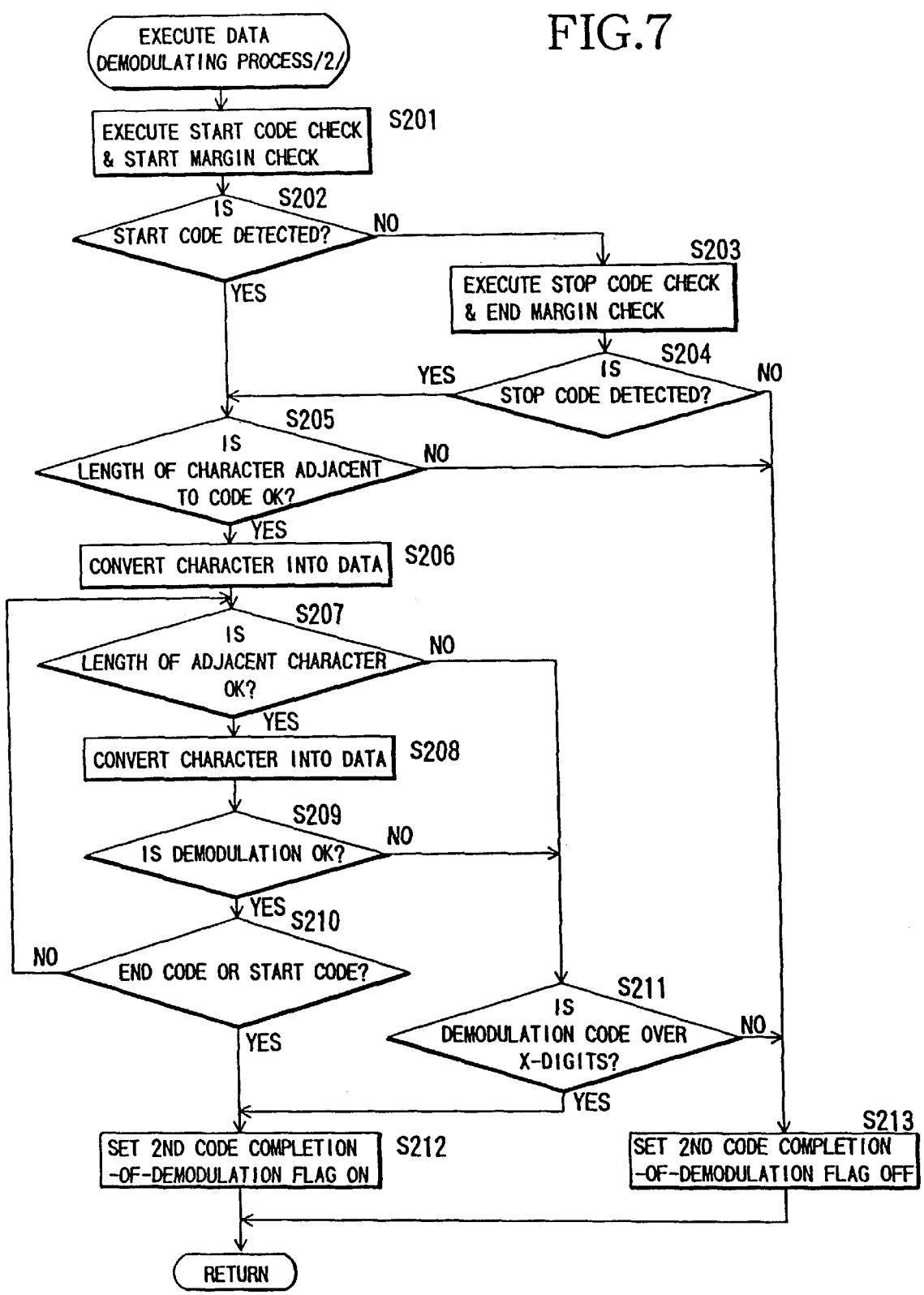
FIG. 7 is a flowchart showing a content of a data demodulating process 2 executed in step S011 of FIG. 2.

Whereas, if the demodulated data has the end guard bar (RGB), in step S011, the data demodulating process (a data demodulating process 2) according to the demodulation algorithm in a CODE 128 code system (a second code system) is executed upon the data width data set which was fetched most recently in step S001 (corresponding to a demodulating unit). FIG. 7 is a flowchart showing a subroutine of the data demodulating process 2. Checked in first step S201 after entering this subroutine is whether or not the bar width data set which was fetched most recently in step S001 includes a pattern corresponding to a start code (start code check), and whether or not this pattern corresponding to the start code is attached with a start margin having a predetermined width (the start margin check).

Checked in next step S202 is whether or not the start code is detected as a result of the start code check in step S201. Then, when the start code is detected, the bar width data set which was fetched most recently in step S001 is conceived to include the CODE 128 bar code, and the processing proceeds to step S205.

Contrastingly, when no start code is detected, in step S203, there are checked whether or nor the bar width data set which was fetched most recently in step S001 includes a stop code (a stop code check) and whether or not this stop code is attached with an end margin having a predetermined width (the end margin check).

Checked in next step S204 whether or not the stop code is detected as a result of the stop code check in step S203. Then, if the stop code is detected, the bar width set which was fetched most recently in step S001 is conceived to include the CODE 128 bar code, and the processing proceeds to step S205. Whereas if the stop code is not detected, the bar width data set which was fetched most recently in step S001 is conceived to include no CODE 128 bar code, and this bar width data set is discarded, and the processing proceeds to step S213.

Checked in step S205 is whether or not a length of the character adjacent to the start or stop code (which is the stop code when the processing enters therein from step S204) satisfies a standard condition of the CODE 128. Then, if the length of this character does not satisfy the standard condition of the CODE 128, the bar width data set is conceived to be picked-up data based on the reflection light from a portion other than the CODE 128 bar code of which configuration had become the same as the start or stop code by any chance. Then, this bar width data set is discarded, and the processing proceeds to step S213.

Whereas, if the length of the character satisfies the standard condition of the CODE 128, in step S206, this character is converted into data (the same character is converted into corresponding data in the CODE 128 code system).

Checked in next step S207 is whether or not the length of a character adjacent to the character which is converted into the data in step S206 satisfies the standard condition of the CODE 128. Then, if the length of that character does not satisfy the standard condition of the CODE 128, the processing proceeds to step S211.

Whereas, if the length of the character meets the standard condition of the CODE 128, in step S208, this character is converted into data (the same character is replaced with corresponding data in the CODE 128 code system).

Checked in next step S209 is whether or not a character is well demodulated in step S206 or S208. Then, if it is ill demodulated, the processing proceeds to step S211. If it is well demodulated, the processing proceeds to step S210.

Checked in step S210 is whether or not a character further adjacent thereto is the stop code (when the processing enters therein directly from step S202) or the start code (when the processing enters therein from step S204). Subsequently, if this further adjacent character does not meet a structure of the stop code or the start code, the processing returns to step S207. Contrastingly, if the further adjacent character satisfies the structure of the stop or start code, it is assumed that the whole CODE 128 bar code has been read at one time, and the processing proceeds to step S212.

On the other hand, it is checked in step S211 whether or not the number of digits of the data demodulated so far is over X-digits. The term "X-digits" represent the number of digits that is determined depending on a type of the second code, and is larger than a half number of digits of the whole second code. Then, if the number of digits of the demodulated data is X-digits or larger, the processing proceeds to step S212. If less than X-digits, the processing proceeds to step S213.

In step S212, a "2ND code completion-of-demodulation flag" is set, and this subroutine finishes. In contrast with this, in step S213, the "2ND code completion-of-demodulation flag" is reset, and this subroutine comes to end.

In a main routing of FIG. 3 to which the processing returns from this data demodulating process 2, whether or not the "2ND code completion-of-demodulation flag" is set in a RAM area of the CPU 1 is checked in next step S012. This "2ND code completion-of-demodulation flag" is a flag set in step S212 (FIG. 7) in the data demodulating process 2 in step S011, and also a flag for showing that at least the start or stop code and the data character of over X-digits subsequent thereto within the CODE 128 bar code are demodulated. If this "2ND code completion-of-demodulation flag" is not set, the bar width data set which was fetched more recently in step S001 is discarded, and the processing returns to step S001 in order to execute the demodulating process by taking a new bar width data set out of the bar width set storage buffer 2.

Whereas, if the "2ND code completion-of-demodulation flag" is set, in step S013, the demodulated data temporary saving buffer 6 is stored with the thus demodulated data, and the data synthesizing process is carried out (corresponding to a second bar code synthesizing unit). This synthesizing process is executed by applying each piece of demodulated data to the CODE 128 format, with a start or stop code included in each demodulated data and common data contained in both of items of demodulated data as clues. After executing the synthesizing process, the processing proceeds to step S014.

Processes in steps S014 to S018 are a series of processes for the modulus 10 check. Checked in step, S014 is whether the start margin is determined to have the predetermined width in the start margin check (S201) with respect to the bar width data set which was fetched most recently in step S001. Then, if the start margin is not determined to have the predetermined width (including a case where the start margin check is not performed), the processing proceeds directly to step S019.

Whereas if the start margin is determined to have the predetermined width, it is checked in step S015, whether the end margin is determined to have the predetermined width in the end margin check (S203) with respect to the bar width data set which was fetched most recently in step S001. Then, if the end margin is not determined to have the predetermined width (including a case where the end margin check is not executed), the processing proceeds directly to step S019.

Whereas, if the end margin is determined to have the predetermined width, in step S016, an overlapped portion is checked. This overlapped portion check involves the check as to whether or not the demodulated data (the data of the second bar code including one discriminating bar) having the start code and the demodulated data (the data of the second bar code including the other discriminating bar) having the stop code are stored in the demodulated data temporary saving buffer 6, and the same data characters of a predetermined number of digits are contained in both of those items of demodulated data. Then, if a result of checking the overlapped portion is NG (i.e., if there are not the demodulated data having the start code or the demodulated data having the stop code, or alternatively if the same data characters of the predetermined plural number of digits are not contained in both of those items, of demodulated data), the processing proceeds directly to step S019.

Whereas, if the result of checking the overlapped portion is OK (i.e., if the demodulated data temporary saving storage buffer 6 is stored with the demodulated data having the start code and the demodulated data having the stop code, and the same data characters of the predetermined number of digits are contain ed in both of those items of demodulated data), whether the result of the modulus 10 check with respect to the CODE 128 bar code is OK or not is checked in step S017. This modulus 10 check is a checking process of determining whether the demodulated data corresponding to the whole CODE 128 bar code are successfully acquired by the synthesizing process in step S013. If a result of this modulus 10 check is NG (indicating a failure of acquiring the demodulated data), the processing proceeds directly to step S019.

Contrastingly, if the result of the modulus 10 check is OK (indicating a success in the acquisition of the demodulated data), a 2ND code M10-OK flag is set in step S018. This 2ND code M10-OK flag indicates that the result of the modulus 10 check with respect to the CODE 128 bar code is OK, i.e., that the demodulated data corresponding to the whole CODE 128 bar code are obtained. As discussed above, in accordance with this embodiment, a condition for OK of the result of the modulus 10 check with respect to the CODE 128 bar code is that both of the start margin and the end margin of the CODE 128 bar code are effective. After setting the flag, the processing proceeds to step S019.

Checked in step S019 is whether or not the demodulated data of the WPC code and the demodulated data of the CODE 128 bar code are prepared enough in the demodulated data temporary saving buffer 6. This check is executed depending on whether both of the 1ST code M10-OK flag (set in step S009) and the 2ND code M10-OK flag(set in step S018) are set. Then, if demodulated data of the WPC code and demodulated data of the CODE 128 bar code are not prepared enough (if the 1ST code M10-OK flag or the 2ND code M10-OK flag is not set), the processing returns to step S001 to acquire demodulated data of a deficient bar code.

Contrastingly if demodulated data of the WPC code and demodulated data of the CODE 128 bar code are prepared enough (if both of the 1ST code M10-OK flag and the 2ND code M10-OK flag are set), in step S020, a process of "reading OK" is executed. In this "reading OK" process, a voice indicating a completion of reading (demodulation) of the bar code is emitted from a loud speaker 10, and items of data about a sales price, etc. of the goods 20 that are obtained as a consequence of the demodulation of the bar code are displayed on a light emitting diode 11. Thereafter, this process comes to an end.

(Operation of Embodiment)

Figure 12:
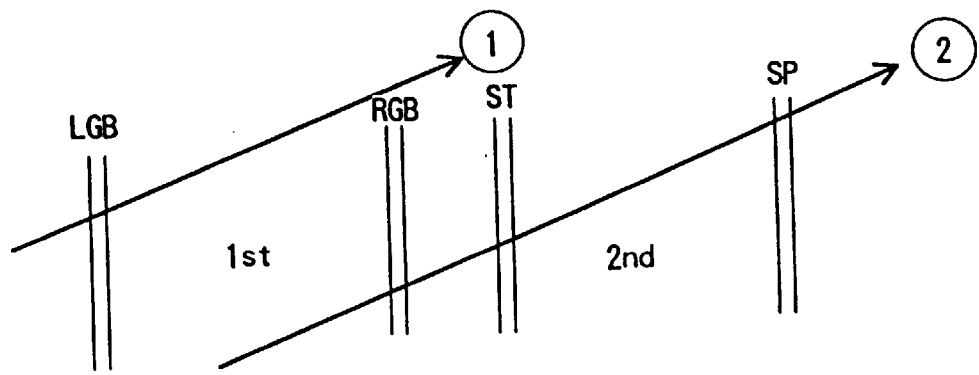
FIG. 12 is a diagram illustrating an example of a scan trajectory on the bar code.

Next, the operation of the above-constructed bar code reading apparatus in this embodiment will be explained with reference to FIG. 12. Now, it is assumed that a coupon code composed of the WPC code (1st) and the CODE 128 bar code (2nd) is scanned with laser beams along a scan trajectory (1) as shown in FIG. 12. This scan trajectory (1) passes through the star guard bar (LGB) of the WPC code (1st) but deviates from above the coupon code at a point anterior to the end guard bar (RG13) of the WPC code (1st).

Accordingly, when the bar width data set along the above scan trajectory (1) is demodulated in conformity to the WPC code system, the first half of the WPC code (1st code) is demodulated. In this time, however, the 1ST code M10-OK flag is not set (S009). Besides, the end guard bar (EGB) is not detected (S010), and hence the demodulating process with respect to that bar width data set is finished without the demodulation according the CODE 128 code system performed. In this case, as a matter of fact, the same bar width data set does not contain any data based on the CODE 128 bar code, and therefore the processing time is reduced by omitting the demodulating process according to the CODE 128 code system.

Next, it is assumed that the coupon code is scanned by the laser beams along a scan trajectory (2). A scan along this scan trajectory (2) on the WPC code (1st) starts from a position closer to the start guard bar (LGB) than the position in which the scan trajectory (1) deviates from the WPC code (1st) up to the stop code (SP) of the CODE 128 bar code (2nd), without stopping.

Accordingly, the bar width data set along the scan trajectory (2) is demodulated according to the WPC code system, so that latter half of the WPC code (1st) is demodulated. As a result, the 1ST code M10-OK flag comes to be set (S009). Besides, since the end guard bar (RGB) is detected (S010), there must be a switchover to the demodulation according to the CODE 128 code system. Then, the demodulation in accordance with the CODE 128 code system is performed, so that the whole CODE 128 is demodulated, and the 2ND code M10-OK flag is set (S018). As a result, both of the 1ST code M10-OK flag and the 2ND code M10-OK flag come to be set, and hence a reading OK process (S020) is executed.

As discussed above, in this embodiment, when the end guard bar (RGB) is detected as a result of performing the demodulation based on the WPC code system, it is assumed that there must be a high probability in which the bar width data set contains the data based on the CODE 128 bar code. Then, the demodulating process according to the CODE 128 code system is executed without a new laser beam scan performed. Consequently, an entire processing time can be reduced.

Embodiment 2

According to the bar code recognizing/demodulating process program in the first embodiment discussed above, the precondition for executing the demodulating process according to the CODE 128 code system is that the 1ST code completion-of-demodulation flag is set. That is, the bar width data set to be processed is previously demodulated in accordance with the WPC code system, and if the 1ST code completion-of-demodulation flag is not set as a result of this (step S003), the process is unable to proceed to the data demodulating process 2 (S011) according to the CODE 128 code system. Hence, if the scan trajectory does not pass through the WPC code at all (or alternatively it passes through only less than 3-digits of the data character of the WPC code), the data demodulation based on the CODE 128 code system is not performed even when the scan trajectory passes through the whole CODE 128 bar code.

The second embodiment is provided to obviate a drawback to the above-mentioned point in the first embodiment. In the second embodiment, even if the 1ST code completion-of-demodulation flag is not set, and if the stop code of the CODE 128 bar code is detected, the demodulation according to the CODE 128 code system is carried out.

(Bar Code Recognizing/Demodulating Process)

Particulars of a bar code recognizing/demodulating process program executed by the CPU 1 of the bar code reading apparatus in the second embodiment of the present invention will be explained with reference to FIGS. 13 and 14.

Figure 13:
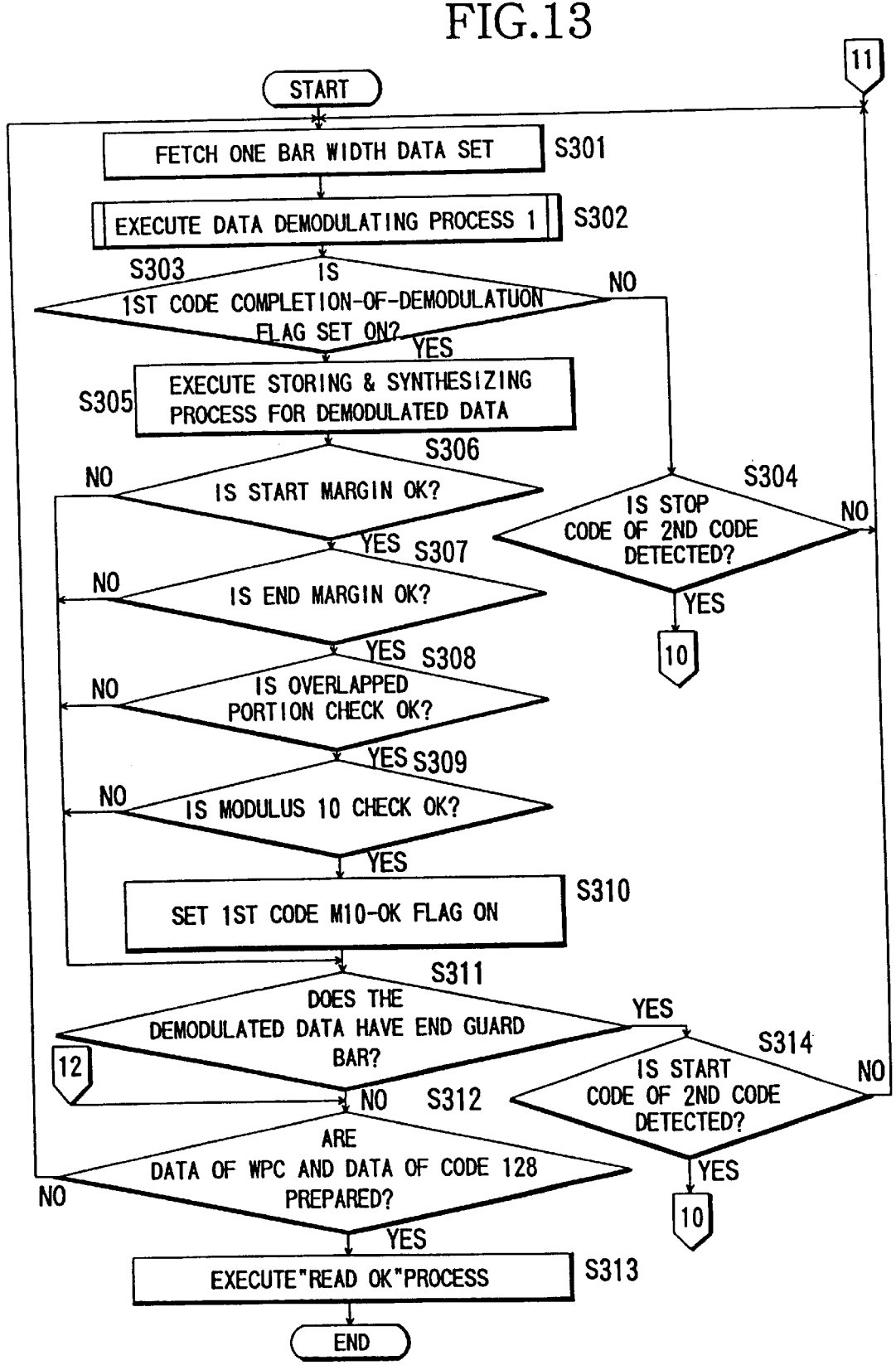
FIG. 13 is a flowchart showing a bar code recognition/demodulation processing program executed by the CPU shown in FIG. 2 in a second embodiment of the present invention.
Figure 14:
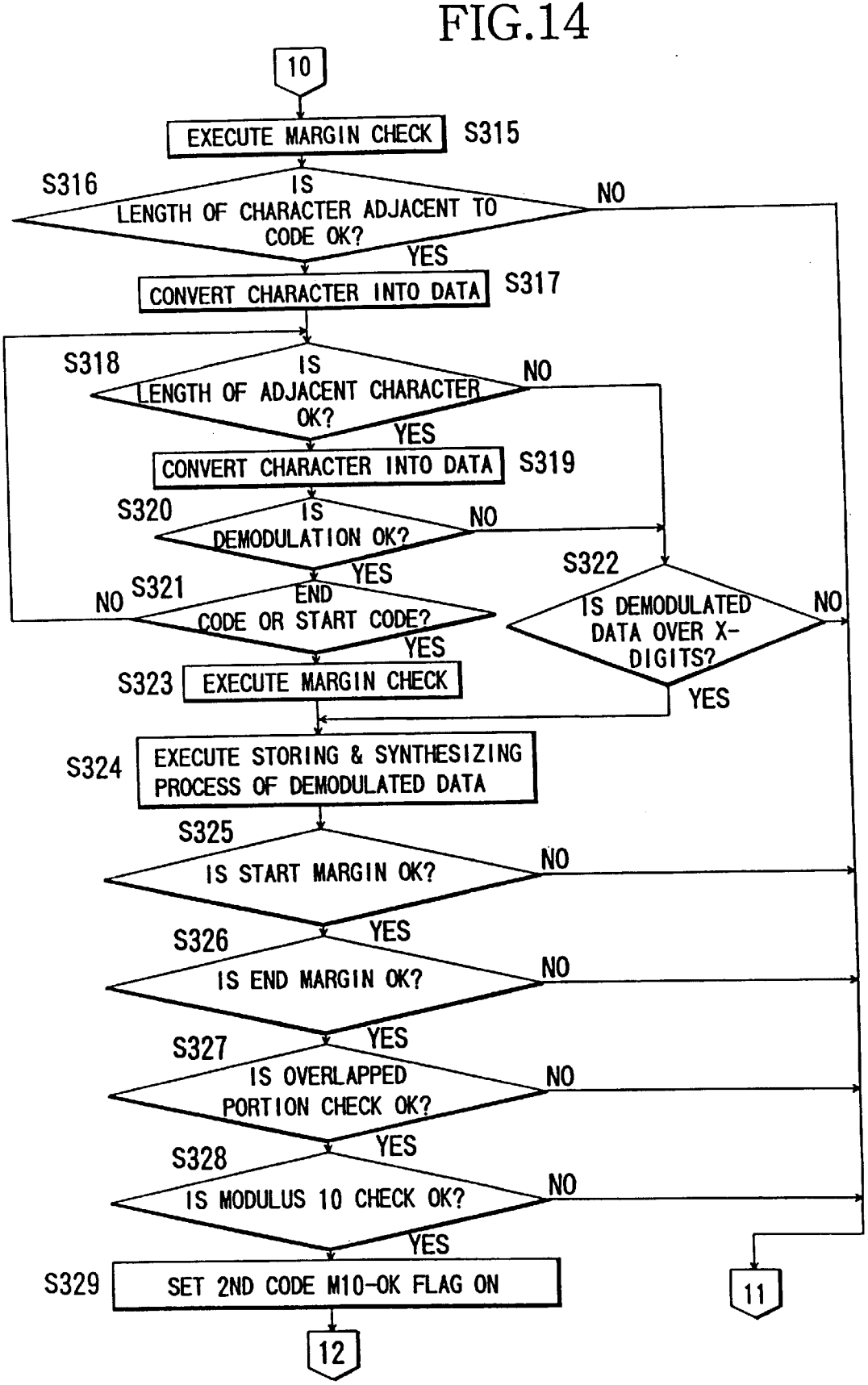
FIG. 14 is a flowchart showing the bar code recognition/demodulation processing program executed by the CPU shown in FIG. 2 in the second embodiment of the present invention.

FIG. 13 is a flowchart showing the main routine which starts when the bar width data set storage buffer 2 is stored with a bar width data set after the main power is supplied to the bar code reading apparatus. Fetched then in first step S001 is one oldest bar width data set out of the bar width data set storage buffer 2.

In next step S302, the data demodulating process (the data demodulating process 1) according to the demodulation algorithm based on the WPC code system is executed on the thus fetched bar width data set (corresponding to the demodulating unit). This data demodulating process 1 is executed based on a subroutine shown in FIGS. 4 to 6.

In next step S303, it is checked whether the "1ST code completion-of-demodulation flag" is set in the RAM area within the CPU 1. If this "1ST code completion-of-demodulation flag" is not set, it is checked in step S304 whether or not the stop code of the CODE 128 bar code is detected from the bar width data set which was fetched most recently in step S301 (corresponding to a second bar code discriminating bar detecting unit). Then, if the stop code is not detected, the same bar width data set is conceived to include no data based on the CODE 128 bar code, and the bar width data set which was fetched most recently in step S301 is discarded. Then, the processing returns to step S301. Whereas, if the stop code is detected, the processing proceeds to step S315 to perform the demodulating process according to the CODE 128 code system.

On the other hand, when it is determined that the "1ST code completion-of-demodulation flag" is set in step S303, the demodulated data temporary saving buffer 6 is stored with the demodulated data in step S305, and the data synthesizing process is executed (corresponding to a first bar code synthesizing unit). After executing the synthesizing process, the processing proceeds to step S306.

Processes in steps S306 to S310 are a series of processes for executing the modulus 10 check. Checked in step S306 is whether the start margin is determined to have the predetermined width in the start margin check (S100, S166) with respect to the bar width data set to be processed this time. Then, if the start margin is not determined to have the predetermined width (including the case where the start margin check is not performed), the processing proceeds directly to step S311.

Whereas if the start margin is determined to have the predetermined width, it is checked in step S307 whether the end margin is determined to have the predetermined width in the end margin check (S133, S152, S169) with respect to the bar width data set which was fetched most recently in step S301. Then, if the end margin is not determined to have the predetermined width (including the case where the end margin check is not executed), the processing proceeds directly to step S311.

Whereas, if the end margin is determined to have the predetermined width, in step S308, the overlapped portion is checked. This overlapped portion check involves a check as to whether or not the demodulated data having the start guard bar and the demodulated data having the end guard bar are stored in the demodulated data temporary saving buffer 6 same data characters of a predetermined number of digits are contained in both of those items of demodulated data. Then, if a result of checking the overlapped portion is NG (i.e., if there are not the demodulated data having the start guard bar or the demodulated data having the end guard bar, or alternatively if the same data characters of the predetermined plural number of digits are not contained in both of those items of demodulated data), the processing proceeds directly to step S311.

Whereas, if the result of checking the overlapped portion is OK (i.e., if the demodulated data temporary saving storage buffer 6 is stored with the demodulated data having the start guard bar and the demodulated data having the end guard bar, and the same data characters of the predetermined number of digits are contained in both of those items of demodulated data), whether the result of the modulus 10 check with respect to the WPC code is OK or not is checked in step S309. Then, if a result of this modulus 10 check is NG (indicating a failure of acquiring the demodulated data), the processing proceeds directly to step S311.

Contrastingly, if the result of the modulus 10 check is OK (indicating a success in the acquisition of the demodulated data), the 1ST code M10-OK flag is set in step S310. As discussed above, in accordance with this embodiment, a condition for OK of the result of the modulus 10 check with respect to the WPC code is that both of the start margin and the end margin of the WPC code are effective. After setting the flag, the processing proceeds to step S311.

Checked in step S311 is whether or not the demodulated data obtained as a result of the data demodulating process 1 (S302) with respect to the bar width data set which was fetched most recently in step S301 has the end guard bar (RGB) (corresponding to the first discriminating bar detecting unit). Then, if this item of demodulated data has no end guard bar (RGB), the processing proceed s directly to S312.

Whereas, if the demodulated data has the end guard bar (RGB), whether or not the start code of the CODE 128 bar code is detected from the bar width data set which was fetched most recently in step S301 is checked in step S314. Then, if the start bar is not detected, the same bar width data set is conceived to include no data based on the CODE 128 bar code, and the bar width data set which was fetched most recently in step S301 is discarded. Then, the processing returns to step S301. Whereas, if the stop code is detected, the processing proceeds to step S315 to perform the demodulating process according to the CODE 128 code system.

Processes from step S315 onward are demodulating processes according to the demodulation algorithm based on the CODE 128 code system. A margin check is executed in step S315. More specifically, in the case that the processing enters therein from step S304, whether or not the stop code is attached with an effective end margin is checked. Contrastingly, in the case that the processing enters therein from step S314, whether or not the start code detected in step S314 is attached with an effective start margin is checked.

Checked in step S316 is whether or not a length of the character adjacent to the start or stop code (which is the start code when the processing enters therein from step S314, or the stop code when the processing enters therein from step S304) satisfies the standard condition of the CODE 128. Then, if the length of this character does not satisfy the standard condition of the CODE 128, the bar width data set is conceived to be a picked-up data based on the reflection light from a portion other than the CODE 128 bar code of which configuration had become the same as the start or stop code by any chance. Then, this bar width data set is discarded, and the processing returns to step S301.

Whereas, if the-length of the character satisfies the standard condition of the CODE 128, in step S317, this character is converted into data (the same character is replaced with corresponding data in the CODE 128 code system) (corresponding to the demodulating unit).

Checked in next step S318 is whether or not the length of a character adjacent to the character which is converted into the data in step S317 satisfies the standard condition of the CODE 128. Then, if the length of that character does not satisfy the standard condition of the CODE 128, the processing proceeds to step S322.

Whereas, if the length of the character meets the standard condition of the CODE 128, in step S319, this character is converted into data (the same character is replaced with corresponding data in the CODE 128 code system) (corresponding to the demodulating unit).

Checked in next step S320 is whether or not the character is well demodulated in step S317 or S319. Then, if it is ill demodulated, the processing proceeds to step S322. If it is well demodulated, the processing proceeds to step S321.

Checked in step S321 is whether or not a character further adjacent thereto is the stop code (when the processing enters therein from step S314) or the start code (when the processing enters therein from step S304). Subsequently, if this further adjacent character does not meet a structure of the stop code or the start code, the processing returns to step S318. Contrastingly, if the further adjacent character satisfies the structure of the stop or start code, it is assumed that the whole CODE 128 bar code has been read at one time, and the processing proceeds to step S323. Checked in step S323 is whether or not the stop or start code detected in step S321 is attached with the effective margin.

On the other hand, it is checked in step S322 whether or not the number of digits of the data demodulated so far is over X-digits. The term "X-digits" represent the number of digits that is determined depending on a type of the second code, and is larger than a half number of digits of the whole second code. Then, if the number of digits of the demodulated data is X-digits or larger, the processing proceeds to step S324. If less than X-digits, trustworthiness of the demodulated data is low, and therefore the processing proceeds to step S301.

In step S324, the demodulated data temporary saving buffer 6 is stored with the thus demodulated data, and the data synthesizing process is carried out (corresponding to the second bar code synthesizing unit). After executing the synthesizing process, the processing proceeds to step S325.

Processes in steps S325 to S328 are a series of processes for the modulus 10 check. Checked in step S325 is whether the start margin is determined to have the predetermined width in the start margin check (S315 or S323) with respect to the bar width data set to be processed this time. Then, if the start margin is not determined to have the predetermined width (including a case where the start margin check is not performed), the processing returns to step S301.

Whereas, if the start margin is determined to have the predetermined width, it is checked in step S326 whether the end margin is determined to be effective in the end margin check (S315 or S323) with respect to the bar width data set which was fetched most recently in step S301. Then, if the end margin is not determined to have the predetermined width (including a case where the end margin check is not executed), the processing returns to step S301.

Whereas, if the end margin is determined to have the predetermined width, in step S327, an overlapped portion is checked. Then, if a result of checking the overlapped portion is NG, the processing returns to step S301.

Whereas if the result of checking the overlapped portion is OK, whether the result of the modulus 10 check with respect to the CODE 128 bar code is OK or not is checked in step S328. If a result of this modulus 10 check is NG (indicating a failure of acquiring the demodulated data), the processing returns to step S301.

Contrastingly, if the result of the modulus 10 check is OK (indicating a success in the acquisition of the demodulated data), the 2ND code M10-OK flag is set in step S329. As discussed above, in accordance with this embodiment, the condition for OK of the result of the modulus 10 check with respect to the CODE 128 bar code is that both of the start margin and the end margin of the CODE 128 bar code are effective. After setting the flag, the processing proceeds to step S312.

Checked in step S312 is whether or not the demodulated data of the WPC code and the demodulated data of the CODE 128 bar code are prepared enough in the demodulated data temporary saving buffer 6. This check is executed depending on whether both of the 1ST code M10-OK flag (set in step S310) and the 2ND code M10-OK flag (set in step S329) are set. Then, if demodulated data of the WPC code and demodulated data of the CODE 128 bar code are not prepared enough (if the 1ST code M10-OK flag or the 2ND code M10-OK flag is not set), the processing returns to step S301 to acquire demodulated data of a deficient bar code.

Contrastingly, if demodulated data of the WPC code and demodulated data of the CODE 128 bar code are prepared enough (if both of the 1ST code M10-OK flag and the 2ND code M10-OK flag are set), in step S313, the process of "reading OK" is executed. After this execution, the processing comes to an end.

(Operation of Embodiment)

Figure 15:
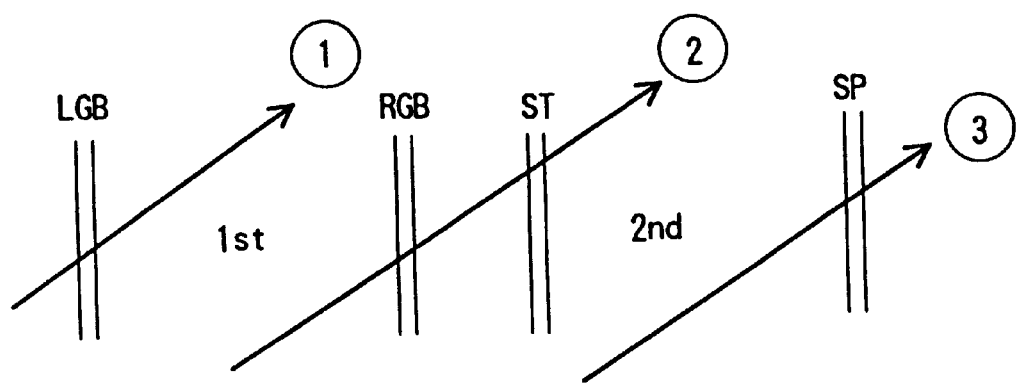
FIG. 15 is a diagram showing an example of the scan trajectory on the bar code.

Next, the operation of the above-constructed bar code reading apparatus in this embodiment will be explained with reference to FIG. 15. Now, it is assumed that a coupon code composed of the WPC code (1st) and the CODE 128 bar code (2nd) is scanned with laser beams along a scan trajectory (1) as shown in FIG. 15. This scan trajectory (1) passes through the star guard bar (LGB) of the WPC code (1st) but deviates from above the coupon code at a point anterior to the end guard bar of the WPC code (1st).

Accordingly, when the bar width data set along the above scan trajectory (1) is demodulated in conformity to the WPC code system, the first half of the WPC code (1st) is demodulated. In this case, however, the 1ST code M10-OK flag is not set (S310). Besides, the end guard bar (EGB) is not detected (S311), and hence the demodulating process with respect to that bar width data set is finished without the demodulation according the CODE 128 code system performed. In this case, as a matter of fact, the same bar width data set does not contain any data based on the CODE 128 bar code, and therefore the processing time is reduced by omitting the demodulating process according to the CODE 128 code system.

Next, it is assumed that the coupon code is scanned with the laser beams along a scan trajectory (2). A scan along this scan trajectory (2) on the WPC code (1st) starts from a position closer to the start guard bar (LGB) than the position in which the scan trajectory (1) deviates from the WPC code (1st), and deviates halfway of the CODE 128 bar code (2nd).

Accordingly, the bar width data set along the scan trajectory (2) is demodulated according to the WPC code system, so that latter half of the WPC code (1st code) is demodulated. As a result, the 1ST code M10-OK flag comes to be set (S310). Besides, the end guard bar (RGB) is detected (S311), and the start code (ST) of the CODE 128 bar code (2nd) is detected (S314). Hence, there must be a switchover to the demodulation according to the CODE 128 code system. Then, the demodulation in accordance with the CODE 128 code system is performed, so that first half of the CODE 128 is demodulated. In this case, from the detection of the end guard bar (RGB), a probability that the data based on the CODE 128 bar code is contained in the bar width data set is determined to be high. Therefore, the entire processing time can be reduced by directly executing the demodulating process according to the CODE 128 code system.

Next, it is assumed that the coupon code is scanned with the laser beams along a scan trajectory (3). Along the scan trajectory (3), the scan on the CODE 128 bar code (2nd) starts a position closer to the start code (ST) than a position in which the scan trajectory (2) deviates from the CODE 128 bar code (2nd) up to the stop code (SP).

Accordingly, when the bar width data set along the scan trajectory (3) is demodulated in accordance with the WPC code system, there is no possibility in which the 1ST code completion-of-demodulation flag is set ON (S303). However, since the stop code (SP) of the CODE 128 bar code (2nd) is detected, there must be the switchover to the demodulation according to the CODE 128 code system. Then, the demodulation based on the CODE 128 code system is performed, so that first half of the CODE 128 bar code (2nd) is demodulated. As a result, the 2ND code M10-OK flag comes to be set (S329).

Thus, in accordance with this embodiment, even if the demodulated data of the WPC code are not obtained at all as a consequence of performing the demodulation according to the WPC code system, the demodulation based on the CODE 128 code system can be performed as far as the stop code of the CODE 128 bar code is detected. Hence, the entire processing time can be reduced.

Other configurations and operations in the second embodiment are the same as those in the first embodiment, and hence the explanations thereof will be omitted.

Embodiment 3

According to the bar code recognition/demodulation processing program in the first embodiment discussed above, the modulus 10 check for each of the bar codes constituting the coupon code is effected based on the demodulated data with the effective margin.

In a starting position where the laser beam starts to scan and a stopping position where the laser beam stops scanning, however, optical noises tend to be caused. Accordingly, there is a possibility in which the start margin of the WPC code and the end margin of the CODE 128 bar code in the coupon code are not measured as those having sufficient widths due to adverse influences of the noises, and those margins are not recognized as effective ones.

The third embodiment is provided to obviate a drawback to the above-mentioned point in the first embodiment. In the third embodiment, if both of the results of the start margin check for the WPC code and the end margin check for the CODE 128 bar code are NG, it is considered that the optical noises are produced, and the results of those margin checks are masked when the modulus 10 check with respect to the individual bar codes constituting the coupon code is performed.

(Bar Code Recognizing/Demodulating Process)

Figure 16:
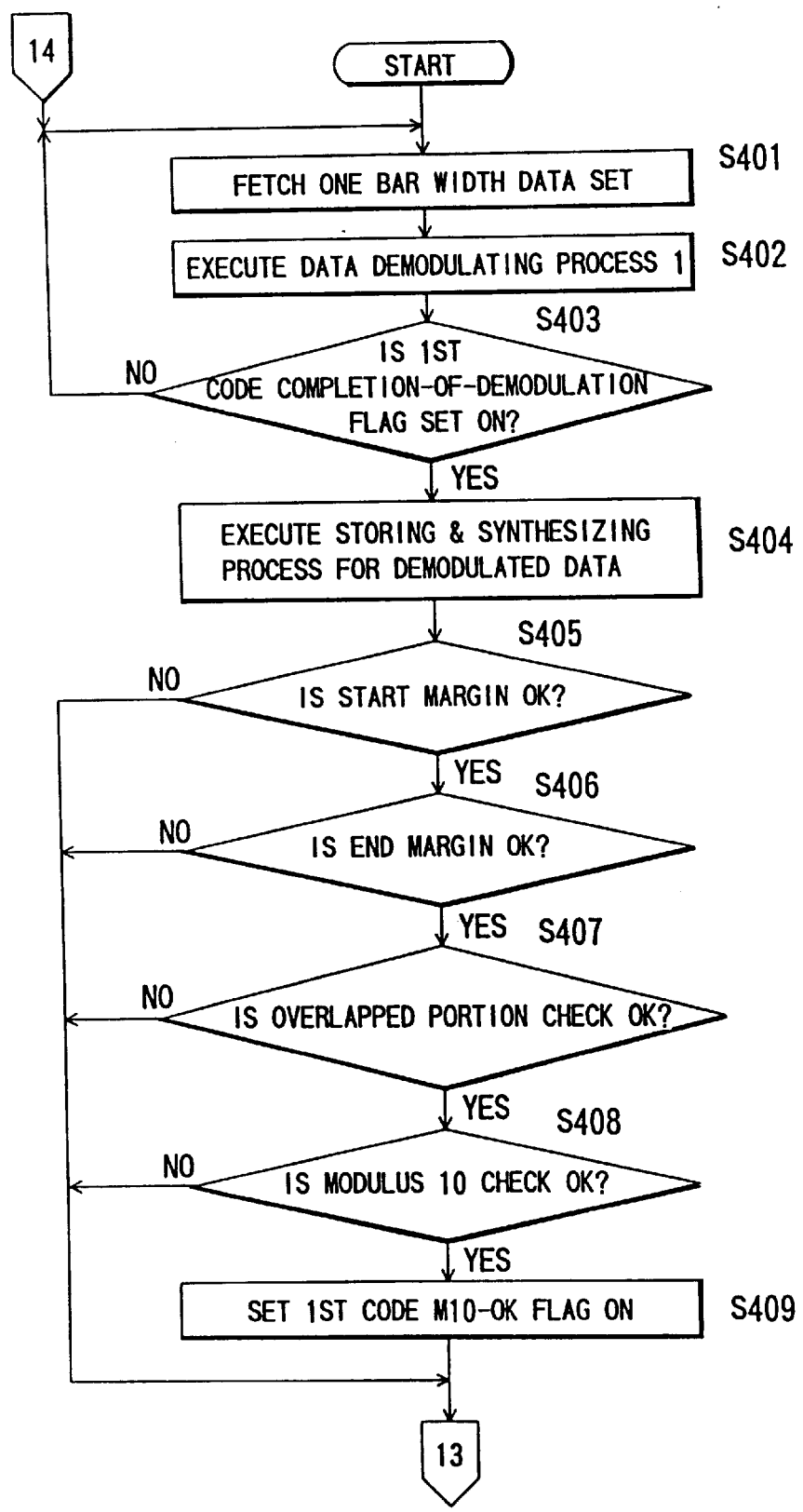
FIG. 16 is a flowchart showing a bar code recognition/demodulation processing program executed by the CPU shown in FIG. 2 in a third embodiment of the present invention.
Figure 17:
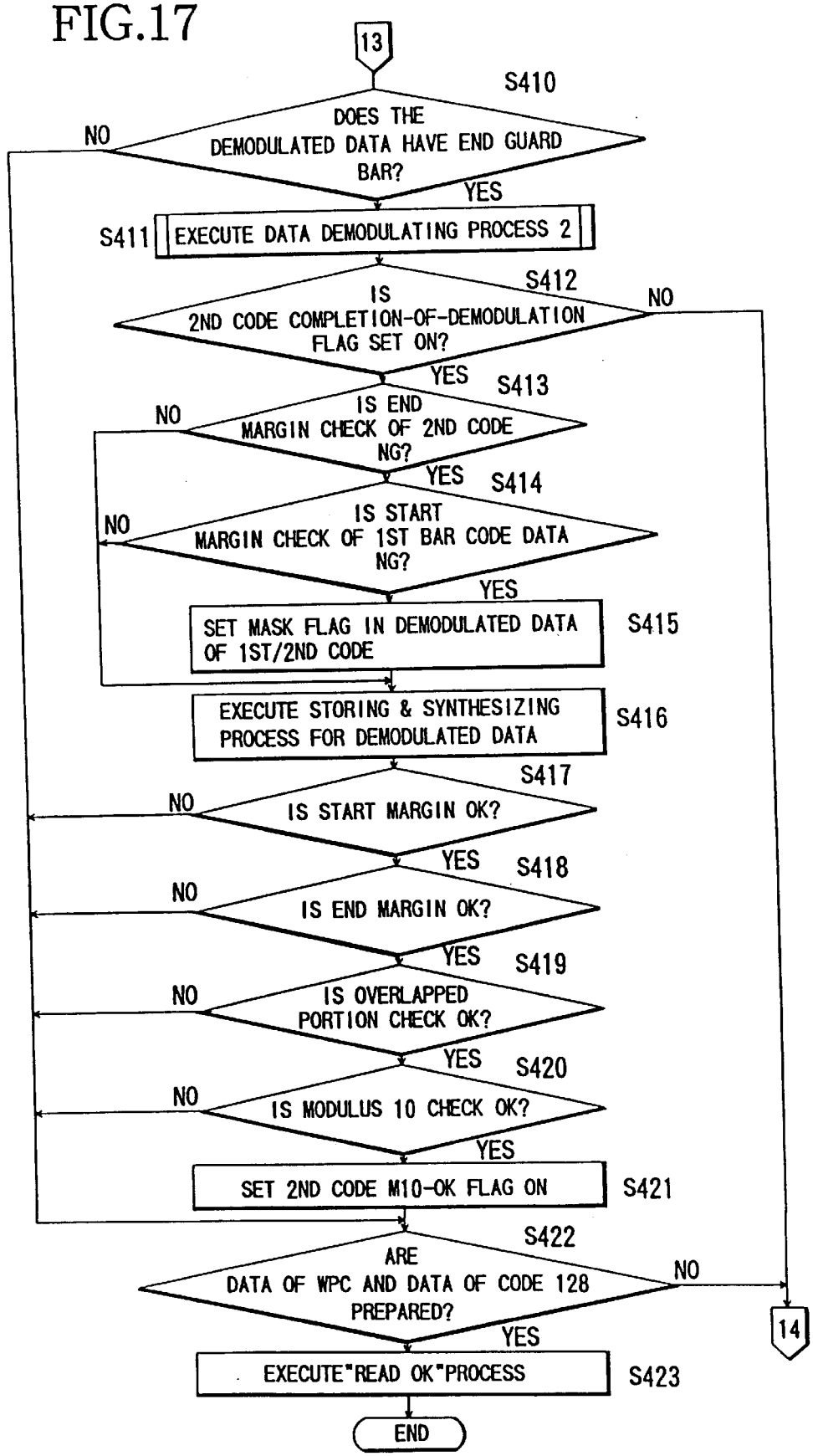
FIG. 17 is a flowchart showing the bar code recognition/demodulation processing program executed by the CPU shown in FIG. 2 in the third embodiment of the present invention.

FIGS. 16 and 17 show particulars of the bar code recognizing/demodulating process program executed by the CPU 1 of the bar code reading apparatus in a third embodiment of the present invention.

FIG. 16 is a flowchart showing the main routine which starts when the bar width data set storage buffer 2 is stored with a bar width data set after the main power is supplied to the bar code reading apparatus. Fetched in first step S401 is one oldest bar width data set out of the bar width data set storage buffer 2.

In next step S402, the data demodulating process (the data demodulating process 1) according to the demodulation algorithm based on the WPC code system is executed on the thus fetched bar width data set (corresponding to the demodulating unit). This data demodulating process 1 is executed based on a subroutine shown in FIGS. 4 to 6.

In next step S403, whether the "1ST code completion-of-demodulation flag" is set in the RAM area within the CPU 1 is checked. If this "1ST code completion-of-demodulation flag" is not set, the bar width data set which was fetched most recently in step S401 is discarded, and the processing returns to step S401 in order to execute the demodulating process by taking a new item of bar width data from the bar width data set storage buffer 2.

Contrastingly, when it is determined that the "1ST code completion-of-demodulation flag" is set in step S403, the demodulated data temporary saving buffer 6 is stored with the thus demodulated data in step S404, and the data synthesizing process is executed (corresponding to the first bar code synthesizing unit). After executing the synthesizing process, the processing proceeds to step S405.

Processes in steps S405 to S409 are a series of processes for executing the modulus 10 check. Checked in step S405 is whether the start margin is determined to have the predetermined width in the start margin check (S100, S166) with respect to the bar width data set which was fetched most recently in step S401. At this time, if a "mask flag" which will be mentioned later is set, the start margin is conceived to have the predetermined width irrespective of a result of the check in step S100 or S166. Then, if the start margin is not determined to have the predetermined width (including the case where the start margin check is not performed), the processing proceeds directly to step S410.

Whereas, if the start margin is determined to have the predetermined width (if conceived to have the predetermined width), it is checked in step S406 whether the end margin is determined to have the predetermined width in the end margin check (S133, S152, S169) with respect to the bar width data set which was fetched most recently in step S401. Then, if the end margin is not determined to have the predetermined width (including the case where the end margin is not executed), the processing proceeds directly to step S410.

Whereas, if the end margin is determined to have the predetermined width, in step S407, the overlapped portion is checked. This overlapped portion check involves a check as to whether or not the demodulated data having the start guard bar and the demodulated data having the end guard bar, are stored in the demodulated data temporary saving buffer 6, and the same data characters of a predetermined number of digits are contained in both of those items of demodulated data. Then, if a result of checking the overlapped portion is NG (i.e., if there is not the demodulated data having the start guard bar or the demodulated data having the end guard bar, or alternatively if the same data characters of the predetermined number of digits are not contained in both of those items of demodulated data), the processing proceeds directly to step S410.

Whereas, if the result of checking the overlapped portion is OK (i.e., if the demodulated data temporary saving storage buffer 6 is stored with the demodulated data having the start guard bar and the demodulated data having the end guard bar, and the same data characters of the predetermined number of digits are contained in both of those items of demodulated data), whether the result of the modulus 10 check with respect to the WPC code is OK or not is checked in step S408. Then, if a result of this modulus 10 check is NG (indicating a failure of acquiring the demodulated data), the processing proceeds directly to step S410.

Contrastingly, if the result of the modulus 10 check is OK (indicating a success in the acquisition of the demodulated data), the 1ST code M10-OK flag is set in step S409. As discussed above, in accordance with this embodiment, a condition for OK of the result of the modulus 10 check with respect to the WPC code is that both of the start margin and the end margin of the WPC code are effective (conceived to be effective). After setting the flag, the processing proceeds to step S410.

Checked in step S410 is whether or not the demodulated data obtained as a result of the data demodulating process 1 (S402) with respect to the bar width data set which was fetched most recently in step S401 time has s pattern corresponding to the end guard bar (RGB) (corresponding to the first discriminating bar detecting unit). Then, if this item of demodulated data has no end guard bar (RGB), the processing proceeds directly to S422.

Whereas, if the demodulated data has the end guard bar (RGB), in step S411, the data demodulating process (the data demodulating process 2) according to the demodulation algorithm in the CODE 128 code system is executed upon the data width data set which was fetched most recently in step S401 (corresponding to the demodulating unit). This data demodulating process 2 is executed based on the flowchart shown in FIG. 7.

Checked in next step S412 is whether or not the "2ND code completion-of-demodulation flag" is set in the RAM area of the CPU 1. If this "2ND code completion-of-demodulation flag" is not set, the bar width data set which was fetched most recently in step S401 is discarded, and the processing returns to step S401 in order to execute the demodulating process by taking a new bar width data set out of the bar width set storage buffer 2.

Whereas, if the "2ND code completion-of-demodulation flag" is set, it is checked in step S413 whether the end margin is determined to have the predetermined width in the end margin check (S203) with respect to the CODE 128 bar code. Then, if the end margin is determined to have the predetermined width, it is determined that the optical noises are not produced, and the processing proceeds directly to step S416.

Whereas, if the end margin is not determined to have the predetermined width, it is checked in step S414 whether the start margin is determined to have the predetermined width in the start margin check (S100, S166) with respect to the WPC code. Then, if the start margin is determined to have the predetermined width, it is determined that the optical noises are not produced, and the processing proceeds directly to step S416.

Whereas, if the start margin is not determined to have the predetermined width, the optical noises must be produced, Then, in step S415, the mask flag is set with respect to the WPC code demodulated data and the CODE 128 bar code demodulated data.

In next step S416, the demodulated data temporary saving buffer 6 is stored with the thus demodulated data, and the data synthesizing process is carried out (corresponding to a second bar code synthesizing unit). This synthesizing process is executed by applying each piece of demodulated data to the CODE 128 format with the start or stop code in the demodulated data as clues. After effecting the synthesizing process, the processing proceeds to step S417.

Processes in steps S417 to S421 are a series of processes for executing the modulus 10 check. Checked in step S417 is whether the start margin is determined to have the predetermined width in the start margin check (S201) with respect to the bar width data set which was fetched most recently in step S401. Then, if the start margin is not determined to have the predetermined width (including the case where the start margin check is not performed), the processing proceeds directly to step S422.

Whereas, if the start margin is determined to have the predetermined width, it is checked in step S418 whether the end margin is determined to have the predetermined width in the end margin check (S203) with respect to the bar width data set which was fetched most recently in step S401. At this time, if the above-mentioned "mask flag" is set, the end margin is conceived to be effective irrespective of a result of the check in step S203. Then, if the end margin is not determined to have the predetermined width (including the case where the end margin check is not performed), the processing proceeds directly to step S422.

Whereas, if the end margin is determined to have the predetermined width (if conceived to be effective), in step S419, the overlapped portion is checked. This overlapped portion check involves a check as to whether or not the demodulated data having the start code and the demodulated data having the stop code are stored in the demodulated data temporary saving buffer 6, and the same data characters of a predetermined plural number of digits are contained in both of those items of demodulated data. Then, if a result of checking the overlapped portion is NG (i.e., if there is not the demodulated data having the start code or the demodulated data having the stop code, or alternatively if the same data characters of the predetermined number of digits are not contained in both of those items of demodulated data), the processing proceeds directly to step S422.

Whereas, if the result of checking the overlapped portion is OK (i.e., if the demodulated data temporary saving storage buffer 6 is stored with the demodulated data having the start code and the demodulated data having the stop code, and the same data characters of the predetermined number of digits are contained in both of those items of demodulated data), whether the result of the modulus 10 check with respect to the CODE 128 bar code is OK or not is checked in step S420. This modulus 10 check is a checking process of determining whether the demodulated data corresponding to the whole CODE 128 bar code are successfully acquired by the synthesizing process in step S416. If a result of this modulus 10 check is NG (indicating a failure of acquiring the demodulated data), the processing proceeds directly to step S422.

Contrastingly, if the result of the modulus 10 check is OK (indicating a success in the acquisition of the demodulated data), the 2ND code M10-OK flag is set in step S421. As discussed above, in accordance with this embodiment, the condition for OK of the result of the modulus 10 check with respect to the CODE 128 bar code is that both of the start margin and the end margin of the CODE 128 bar code are effective (conceived to be effective). After setting the flag, the processing proceeds to step S422.

Checked in step S422 is whether or not the demodulated data of the WPC code and the demodulated data of the CODE 128 bar-code are prepared enough in the demodulated data temporary saving buffer 6. This check is executed depending on Whether both of the 1ST code M10-OK flag (set in step S409) and the 2ND code M10-OK flag (set in step S421) are set. Then, if demodulated data of the WPC code and demodulated data of the CODE 128 bar code are not prepared enough (if the 1ST code M10-OK flag or the 2ND code M10-OK flag is not set), the processing returns to step S401 to acquire demodulated data of a deficient bar code.

Contrastingly, if demodulated data of the WPC code and demodulated data of the CODE 128 bar code are prepared enough (if both of the 1ST code M10-OK flag and the 2ND code M10-OK flag are set), in step S423, the process of "reading OK" is executed. After this process, the processing comes to an end.

(Operation of Embodiment)

In accordance with third embodiment, in a state where the optical noises of the laser beams are not produced, only the demodulated data attached with the effective margin is employed when the modulus 10 checks are executed with respect to all the bar codes constituting the coupon code. Accordingly, if the demodulated data is not attached with the effective margin, the result of the modulus 10 check becomes NG. Whereas, if the optical noises of the laser beams are produced, both of the start margin of the WPC. code and the end margin of the CODE 128 bar code are detected as ineffective margins. In this case, the start margin of the WPC code and the end margin of the CODE 128 bar code are treated as effective ones regardless of the result of the margin check. Accordingly, the result of the modulus 10 check and a regeneration of the coupon code receives no influences of the optical noises of the laser beams.

Other configurations and operations in the third embodiment are the same as those in the first embodiment, and hence the explanations thereof are omitted.

Embodiment 4

The bar code reading apparatus in accordance with a fourth embodiment is constructed to simplify the bar code recognizing/demodulating process program by setting, to a fixed length, the number of digits of the CODE 128 bar code defined as a second code and by making the demodulating process executable in only such a case that the whole coupon code can be read by the one scanning operation with the leaser beams.

(Bar Code Recognizing/Demodulating Process)

Figure 18:
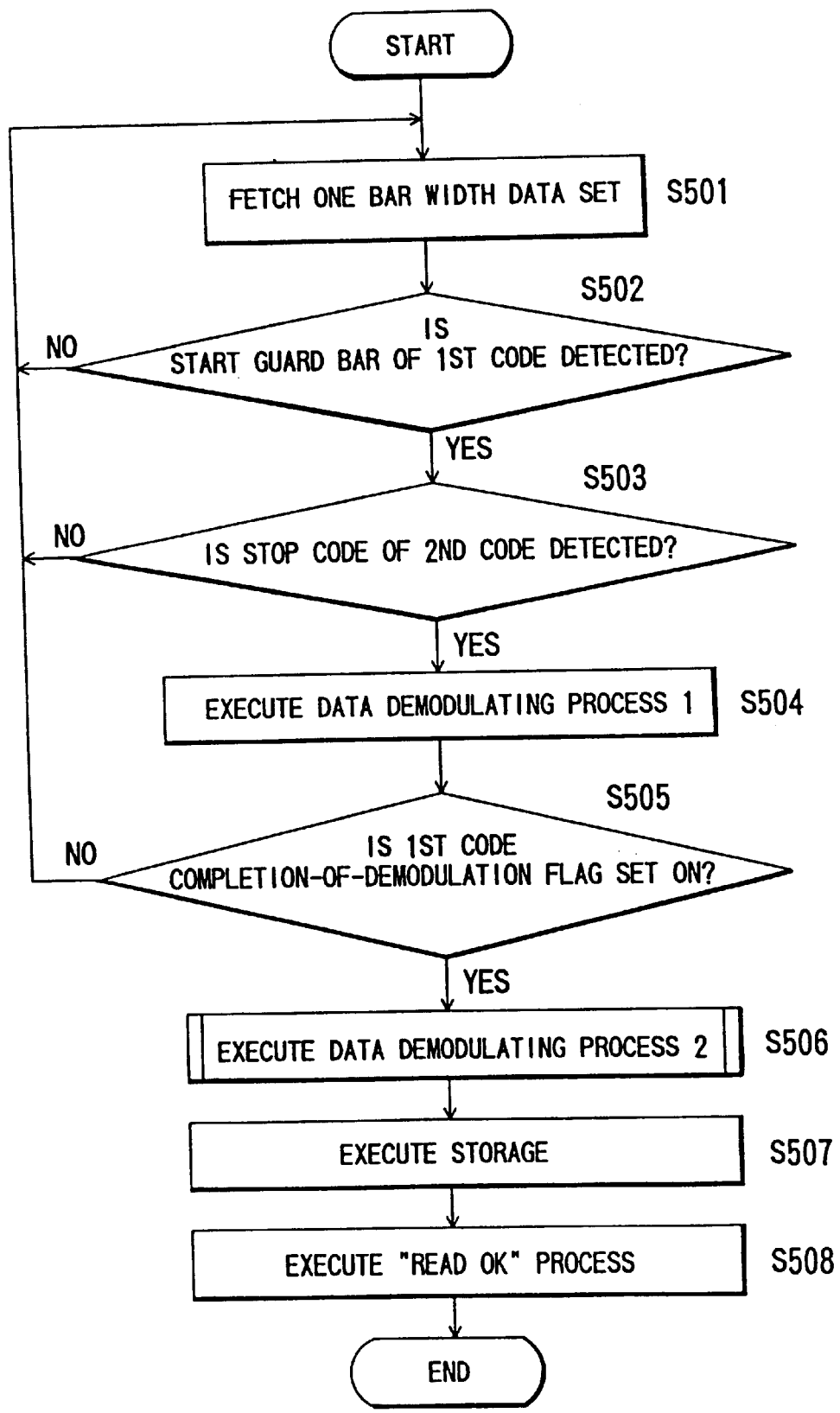
FIG. 18 is a flowchart showing a bar code recognition/demodulation processing program executed by the CPU shown in FIG. 2 in a fourth embodiment of the present invention.

FIG. 18 shows particulars of a bar code recognizing/demodulating process program executed by the CPU 1 of the bar code reading apparatus in the fourth embodiment of the present invention.

FIG. 18 is a flowchart showing the main routine which starts when the bar width data set storage buffer 2 is stored with a bar width data set after the main power is supplied to the bar code reading apparatus. Fetched in first step S501 is one oldest bar width data set out of the bar width data set storage buffer 2.

Checked in next step S502 is whether the start guard bar (LGB) of the WPC code is detected from the thus fetched bar width data set (corresponding to an discriminating bar detecting unit). Then, in the case that the start guard bar of the WPC code is not detected, the whole coupon code is not read by one scanning operation with the leaser beams, and therefore the processing returns to step S501.

Contrastingly, if the start guard bar (LGB) of the WPC code is detected, in step S503, whether or not the stop code of the CODE 128 bar code is detected is checked (corresponding to the discriminating bar detecting unit). Subsequently, in the case that the stop code of the CODE 128 bar code is not detected, the whole coupon code is not read by one scanning operation with the laser beams, and therefore the processing returns to step S501.

Whereas, in the case that the stop code of the CODE 128 bar code is detected, the whole coupon code is read by one scanning operation with the laser beams, and hence the processing proceeds to step S504.

In step S504, the data demodulating process (the data demodulating process 1) according to the demodulation algorithm in the WPC code system is executed upon the data width data set which was fetched most recently in the process in step S501 (corresponding to the demodulating unit). This demodulating process is executed based on the subroutine shown in FIGS. 4 through 6.

In next step S505, whether the "1ST code completion-of-demodulation flag" is set in the RAM area within the CPU 1 is checked. If this "1ST code completion-of-demodulation flag" is not set, the bar width data set which was fetched most recently in step S501 is discarded, and the processing returns to step S501 in order to execute the demodulating process by taking a new item of bar width data set from the bar width data set storage buffer 2.

Contrastingly, if the "1ST code completion-of-demodulation flag" is set, in step S506, the data demodulating process (the data demodulating process 2) according to the demodulation algorithm in the CODE 128 code system is executed upon the data width data set which was fetched most recently in step S501 (corresponding to the demodulating unit). This data demodulating process 2 is executed based on the subroutine shown in FIG. 8.

In next step S507, all the demodulated data are stored in the demodulated data temporary saving buffer 6. In next step S508, the "reading OK" process is executed. After this process, this processing is finished.

(Operation of Embodiment)

Figure 19:
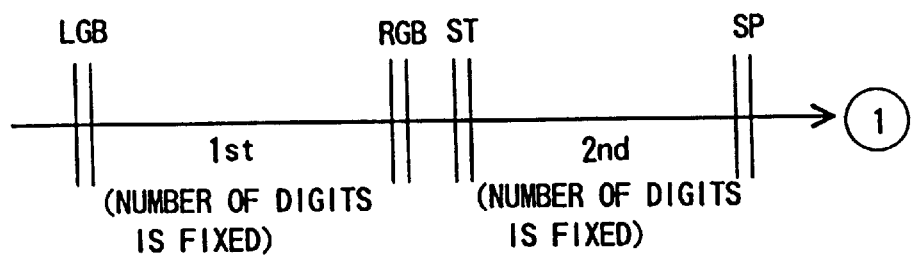
FIG. 19 is a diagram showing an example of the scan trajectory on the bar code.
Figure 20:
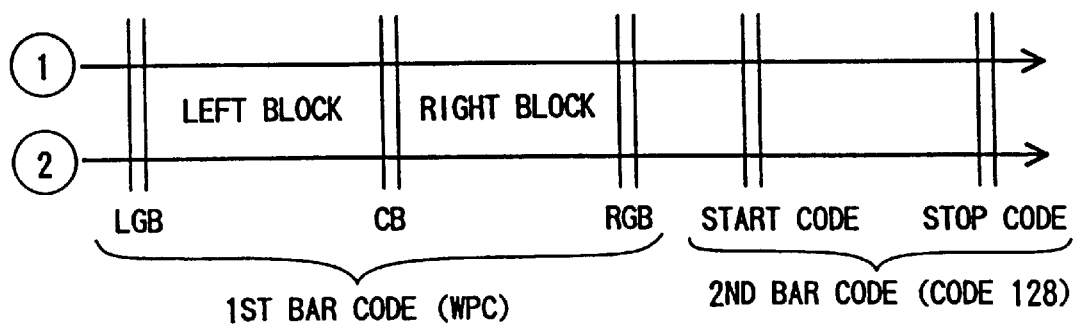
FIG. 20 is an explanatory diagram showing a bar code demodulation in the prior art.

Next, the operation of the thus constructed bar code reading apparatus in the fourth embodiment will be explained with reference to FIG. 19. Now, it is assumed that the coupon code composed of the WPC code (1st) and the CODE 128 bar code (2nd) is scanned with laser beams along the scan trajectory (1) as shown in FIG. 19. This scan trajectory (1) passes through the star guard bar (LGB) of the WPC code (1st) and the stop code (SP) of the CODE 128 bar code. Hence, it can be considered that the scan trajectory (1) passes above the coupon code between the start guard bar (LGB) and the stop code (SP).

In this case, the demodulating process according to the WPC code system is executed first upon the bar width data set obtained by the scan trajectory (1). Next, the demodulating process according to the CODE 128 code system is executed. Accordingly, the demodulated data corresponding to the whole coupon code are obtained by only one scanning operation with the leaser beams. Besides, there is no necessity for performing the modulus 10 check and the synthesizing process for each of the bar codes constituting the coupon code. It is therefore possible to remarkably reduce the whole processing time.

Other configurations and operations in the fourth embodiment are the same as those in the first embodiment, and the explanations thereof are omitted.

The thus constructed bar code reading apparatus of the present invention is constructed to switch over the demodulation algorithm for the bar width data set obtained during one bar code scanning operation halfway of the demodulating process. Therefore, the demodulating process can be executed effectively, and the whole demodulating time can be reduced.

According to the invention being thus described, it will be obvious that the same may be varied in same ways. Such variations are not to be regarded as a departure from the spirit and scope of the invention, and all such medications as would be obvious to one skilled in the art are intended to be included within the scope of the following claims.

We claim:

1. A bar code reading apparatus for reading a code composed of a first bar code in which data based on a first code algorithm is put between discriminating bars having a fixed pattern and a second bar code in which data based on a second code algorithm is contained, said first bar code and said second bar code arranged in one direction, said apparatus comprising:

a scanning unit for scanning a surface of an object to detect a bright/dark pattern along a trajectory of a scan;

a first discriminating bar detecting unit for detecting a pattern corresponding to the discriminating bar of the first bar code that is disposed on the side adjacent to the second bar code from the bright/dark pattern detected by said scanning unit; and a demodulating unit for demodulating the bright/dark pattern detected by said scanning unit in accordance with the first code algorithm, and for demodulating the bright/dark pattern in accordance with the second code algorithm when said first discriminating bar detecting unit detects said pattern corresponding to the discriminating bar of the first bar code that is disposed on the side adjacent to the second bar code.

* * * * *